(12) United States Patent
Yamauchi et al.

(10) Patent No.: US 11,649,308 B2
(45) Date of Patent: May 16, 2023

(54) RESIN COMPOSITION, INORGANIC FINE PARTICLE-DISPERSED SLURRY COMPOSITION, INORGANIC FINE PARTICLE-DISPERSED SHEET, METHOD FOR MANUFACTURING ALL-SOLID-STATE BATTERY, AND METHOD FOR MANUFACTURING LAMINATED CERAMIC CAPACITOR

(71) Applicant: SEKISUI CHEMICAL CO., LTD., Osaka (JP)

(72) Inventors: Kenji Yamauchi, Yamaguchi (JP); Tatsuya Matsukubo, Yamaguchi (JP); Shinya Nakano, Yamaguchi (JP); Jo Otsuka, Yamaguchi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 101 days.

(21) Appl. No.: 16/621,005

(22) PCT Filed: Jun. 21, 2018

(86) PCT No.: PCT/JP2018/023655
§ 371 (c)(1),
(2) Date: Dec. 10, 2019

(87) PCT Pub. No.: WO2018/235907
PCT Pub. Date: Dec. 27, 2018

(65) Prior Publication Data
US 2020/0199345 A1 Jun. 25, 2020

(30) Foreign Application Priority Data

Jun. 23, 2017 (JP) .............................. JP2017-123330
Sep. 6, 2017 (JP) .............................. JP2017-171574
Nov. 29, 2017 (JP) .............................. JP2017-229160
Dec. 12, 2017 (JP) .............................. JP2017-237758
Mar. 16, 2018 (JP) .............................. JP2018-049722

(51) Int. Cl.
| | | |
|---|---|---|
| *C08F 220/18* | (2006.01) | |
| *C08F 220/14* | (2006.01) | |
| *C08F 220/32* | (2006.01) | |
| *C08F 220/26* | (2006.01) | |
| *C08K 3/013* | (2018.01) | |
| *C08J 5/18* | (2006.01) | |
| *C08K 3/08* | (2006.01) | |
| *C08K 3/40* | (2006.01) | |
| *C08K 5/00* | (2006.01) | |
(Continued)

(52) U.S. Cl.
CPC ...... *C08F 220/14* (2013.01); *C08F 220/1802* (2020.02); *C08F 220/1804* (2020.02); *C08F 220/1808* (2020.02); *C08F 220/1811* (2020.02); *C08F 220/1818* (2020.02); *C08F 220/325* (2020.02); *C08J 5/18* (2013.01); *C08K 3/013* (2018.01); *C08K 3/08* (2013.01); *C08K 3/40* (2013.01); *C08K 5/0016* (2013.01); *C08K 5/092* (2013.01); *C08L 33/10* (2013.01); *H01G 4/06* (2013.01); *C08F 220/286* (2020.02); *C08K 2003/0818* (2013.01); *C08K 2003/0881* (2013.01); *C08L 2203/30* (2013.01)

(58) Field of Classification Search
CPC .......... C08F 220/1804; C08F 220/1802; C08F 220/1818; C08F 220/1808; C08F 220/1811; C08F 220/325; C08F 220/14
See application file for complete search history.

(56) References Cited

U.S. PATENT DOCUMENTS

| | | | | |
|---|---|---|---|---|
| 5,610,250 A | * | 3/1997 | Veregin | .................. C08F 10/00 526/204 |
| 6,663,741 B1 | | 12/2003 | Inoue et al. | |

(Continued)

FOREIGN PATENT DOCUMENTS

| | | |
|---|---|---|
| CN | 1355832 | 6/2002 |
| CN | 102399499 | 4/2012 |

(Continued)

OTHER PUBLICATIONS

Machine translation into English of JP 2012-119364 A; Yanagisawa et al. (Year: 2014).*
Machine translation into English of JP 2014-208753 A; Yamauchi et al. (Year: 2012).*
Extended European Search Report dated Mar. 4, 2021 in corresponding European Patent Application No. 18821297.1.

(Continued)

*Primary Examiner* — Karuna P Reddy
(74) *Attorney, Agent, or Firm* — Wenderoth, Lind & Ponack, L.L.P.

(57) ABSTRACT

A resin composition which has excellent decomposability at low temperature, can provide a molded article having high strength, and enables an increase in the number of layers and thinning so as to enable production of an all-solid-state battery and a ceramic laminate having excellent properties. An inorganic fine particle-dispersed slurry composition containing the resin composition, an inorganic fine particle-dispersed sheet, a method for producing an all-solid-state battery, and a method for producing a multilayer ceramic capacitor. A resin composition containing a (meth)acrylic resin, the (meth)acrylic resin containing 20 to 70% by weight in total of a segment derived from methyl methacrylate and a segment derived from isobutyl methacrylate, 1 to 10% by weight of a segment derived from a glycidyl group-containing (meth)acrylate, and 5 to 40% by weight of a segment derived from a (meth)acrylate containing an ester substituent having a carbon number of 8 or more.

9 Claims, No Drawings

(51) Int. Cl.
*C08K 5/092* (2006.01)
*C08L 33/10* (2006.01)
*H01G 4/06* (2006.01)
*C08F 220/28* (2006.01)

(56) References Cited

U.S. PATENT DOCUMENTS

| | | | |
|---|---|---|---|
| 2009/0033859 A1 | 2/2009 | Ueda et al. | |
| 2015/0011675 A1* | 1/2015 | Fukaumi | C09D 133/10 |
| | | | 523/135 |
| 2015/0315305 A1 | 11/2015 | Matsumoto et al. | |
| 2016/0168413 A1* | 6/2016 | Chao | C09D 133/12 |
| | | | 428/220 |
| 2018/0311941 A1 | 11/2018 | Nakada et al. | |

FOREIGN PATENT DOCUMENTS

| | | |
|---|---|---|
| CN | 104822766 | 8/2015 |
| EP | 2 204 391 | 7/2010 |
| JP | 64-80434 | 3/1989 |
| JP | 2605542 | 2/1997 |
| JP | 9-251923 | 9/1997 |
| JP | 10-167836 | 6/1998 |
| JP | 2001-49070 | 2/2001 |
| JP | 2002-294101 | 10/2002 |
| JP | 2003-206355 | 7/2003 |
| JP | 2009-120635 | 6/2009 |
| JP | 2009-144079 | 7/2009 |
| JP | 2009-271101 | 11/2009 |
| JP | 2011-5670 | 1/2011 |
| JP | 2011-192606 | 9/2011 |
| JP | 2012-119364 | 6/2012 |
| JP | 2012119364 A * | 6/2012 |
| JP | 2014-22455 | 2/2014 |
| JP | 2014-208753 | 11/2014 |
| JP | 2014208753 A * | 11/2014 |
| JP | 2015-163713 | 9/2015 |
| JP | 2016-72120 | 5/2016 |
| JP | 2016-100505 | 5/2016 |
| WO | 2006/137449 | 12/2006 |
| WO | 2016/175119 | 11/2016 |

OTHER PUBLICATIONS

International Search Report dated Sep. 18, 2018 in International (PCT) Application No. PCT/JP2018/023655.

* cited by examiner

RESIN COMPOSITION, INORGANIC FINE PARTICLE-DISPERSED SLURRY COMPOSITION, INORGANIC FINE PARTICLE-DISPERSED SHEET, METHOD FOR MANUFACTURING ALL-SOLID-STATE BATTERY, AND METHOD FOR MANUFACTURING LAMINATED CERAMIC CAPACITOR

TECHNICAL FIELD

The present invention relates to a resin composition which has excellent decomposability at low temperature, can provide a molded article having high strength, and enables an increase in the number of layers and thinning so as to enable production of an all-solid-state battery and a ceramic laminate (e.g., a multilayer ceramic capacitor) having excellent properties. The present invention also relates to an inorganic fine particle-dispersed slurry composition containing the resin composition, an inorganic fine particle-dispersed sheet, a method for producing an all-solid-state battery, and a method for producing a multilayer ceramic capacitor.

BACKGROUND ART

Compositions containing inorganic fine particles (e.g., ceramic powder or glass particles) dispersed in a binder resin have been used in production of laminated electronic components such as multilayer ceramic capacitors.

Such multilayer ceramic capacitors are commonly produced by the following method. First, additives such as a plasticizer and a dispersant are added to a solution of a binder resin in an organic solvent. Ceramic raw material powder is then added, and the materials are uniformly mixed with a ball mill or the like to give an inorganic fine particle-dispersed composition.

The obtained inorganic fine particle-dispersed composition is casted on a surface of a support such as a release-treated polyethylene terephthalate film or a SUS plate using a doctor blade, a reverse roll coater, or the like. The organic solvent and other volatile components are evaporated, and then the composition is separated from the support to give a ceramic green sheet.

Next, a conductive paste to form an internal electrode is applied to the obtained ceramic green sheet by screen printing or the like. Sheets obtained in this manner are stacked and pressure-bonded with heat to prepare a laminate. The obtained laminate is heated to perform what is called "degreasing", a treatment to remove components such as the binder resin by pyrolysis. The laminate is then fired to give a ceramic fired body including internal electrodes. External electrodes are then applied to the end surfaces of the ceramic fired body, followed by firing. A multilayer ceramic capacitor is thus completed.

All-solid-state batteries including a ceramic solid electrolyte have attracted attention to solve problems such as heating and ignition.

Such a ceramic solid electrolyte is formed by dispersing inorganic fine particles such as lithium-containing glass fine particles in a binder resin to prepare an inorganic fine particle-dispersed slurry composition, molding the composition into a green sheet, and subjecting the green sheet to a firing step to form a sheet-form solid electrolyte.

Such an inorganic fine particle-dispersed slurry composition typically contains a polyvinyl acetal resin (PVB) as a binder. PVB, however, has a high decomposition temperature and cannot be used in application in which firing at low temperature is desirable.

In such a situation, use of a (meth)acrylic resin which can be fired at low temperature and leaves a smaller amount of residual carbon components after firing has been studied.

For example, Patent Literature 1 discloses a binder composition for ceramic molding, wherein the binder composition has a molecular weight of 160,000 to 180,000 and contains 60 to 99% by weight of isobutyl methacrylate, 1 to 39% by weight of 2-ethylhexyl methacrylate, and 1 to 15% by weight of a methacrylate having a hydroxy group at the β- or ω-position.

Such a resin composition, however, has a glass transition temperature Tg of about 28° C. to about 52° C., and is brittle as a whole. In addition, although such a resin composition rapidly decomposes from 200° C., it is less likely to decompose around 300° C. and tends to leave soot. As a result, the resulting multilayer electronic component has reduced properties.

Patent Literature 2 discloses a copolymer of 70% by weight or more of isobutyl methacrylate with butyl methacrylate, a cycloalkyl group-containing methacrylate, a hydroxy group-containing methacrylate, and a monomer containing an ester substituent having a carbon number of 8 or more. To ensure the decomposability, such a copolymer is characterized in that a component having a molecular weight of 150,000 accounts for 5/6 or more of the entire copolymer.

Such a copolymer is unfortunately also brittle as a whole. In addition, 50% or more of such a copolymer remains undecomposed around 300° C. Especially when such a copolymer is used for production of a solid electrolyte for an all-solid-state battery, residual carbide is produced in the electrolyte layer, causing self-discharge, internal short circuit, and the like.

To counter the situation, use of an acrylic resin that has excellent decomposability at low temperature, such as polyisobutyl methacrylate, as a binder has been considered.

However, although polyisobutyl methacrylate starts decomposing at a lower temperature than other (meth)acrylic homopolymers, its decomposition ending temperature is hardly different from those of other homopolymers. The decomposition characteristics thus deteriorate in the middle of degreasing, so that degreasing takes a prolonged period of time. This causes deterioration of the electrolyte during the use of the solid electrolyte. Moreover, residue of the binder resin deteriorates the characteristics of the all-solid-state battery.

CITATION LIST

Patent Literature

Patent Literature 1: JP H10-167836 A
Patent Literature 2: JP 2605542 B

SUMMARY OF INVENTION

Technical Problem

The present invention aims to provide a resin composition which has excellent decomposability at low temperature, can provide a molded article having high strength, and enables an increase in the number of layers and thinning so as to enable production of an all-solid-state battery and a ceramic laminate (e.g., a multilayer ceramic capacitor) having excellent properties. The present invention also aims to provide an inorganic fine particle-dispersed slurry composition containing the resin composition, an inorganic fine particle-dispersed sheet, a method for producing an all-solid-state battery, and a method for producing a multilayer ceramic capacitor.

Solution to Problem

The present invention relates to a resin composition containing a (meth)acrylic resin, the (meth)acrylic resin containing 20 to 70% by weight in total of a segment derived from methyl methacrylate and a segment derived from isobutyl methacrylate, 1 to 10% by weight of a segment derived from a glycidyl group-containing (meth)acrylate, and 5 to 40% by weight of a segment derived from a (meth)acrylate containing an ester substituent having a carbon number of 8 or more.

The present invention is described in detail below.

The present inventors found out that when isobutyl methacrylate, methyl methacrylate, a glycidyl group-containing (meth)acrylate, and a (meth)acrylate containing an ester substituent having a carbon number of 8 or more are mixed in predetermined amounts, the resulting composition containing a (meth)acrylic resin can exhibit highly excellent decomposability at low temperature and provide a molded article having high strength. The inventors further found out that the composition enables further lamination and thinning of the resulting ceramic green sheets so as to enable production of an all-solid-state battery having excellent properties. They thus completed the present invention.

The resin composition of the present invention contains a (meth)acrylic resin.

The (meth)acrylic resin contains 20 to 70% by weight in total of a segment derived from methyl methacrylate and a segment derived from isobutyl methacrylate. The (meth)acrylic resin also contains 1 to 10% by weight of a segment derived from a glycidyl group-containing (meth)acrylate. The (meth)acrylic resin also contains 5 to 40% by weight of a segment derived from a (meth)acrylate containing an ester substituent having a carbon number of 8 or more.

The (meth)acrylic resin has only to contain 20 to 70% by weight in total of the segment derived from methyl methacrylate and the segment derived from isobutyl methacrylate. The (meth)acrylic resin may contain the segment derived from methyl methacrylate and may not contain the segment derived from isobutyl methacrylate. Alternatively, the (meth)acrylic resin may contain the segment derived from isobutyl methacrylate and may not contain the segment derived from methyl methacrylate. The (meth)acrylic resin may contain both of the segment derived from methyl methacrylate and the segment derived from isobutyl methacrylate.

In the (meth)acrylic resin, the lower limit of the total amount of the segment derived from methyl methacrylate and the segment derived from isobutyl methacrylate is 20% by weight and the upper limit thereof is 70% by weight.

When the total amount is 20% by weight or more, the yield stress can be increased, so that an inorganic powder dispersion sheet having resilience can be obtained. When the total amount is 70% by weight or less, both the decomposability at low temperature and the sheet strength can be achieved.

The lower limit of the total amount is preferably 25% by weight, more preferably 30% by weight, still more preferably 50% by weight. The upper limit thereof is preferably 65% by weight, more preferably 60% by weight.

In the (meth)acrylic resin, the lower limit of the amount of the segment derived from methyl methacrylate is preferably 5% by weight, more preferably 7.5% by weight, still more preferably 15% by weight, further more preferably 20% by weight, particularly preferably 25% by weight. The upper limit thereof is preferably 68% by weight, more preferably 66.5% by weight, still more preferably 50% by weight, further more preferably 40% by weight, particularly preferably 35% by weight.

In the (meth)acrylic resin, the lower limit of the amount of the segment derived from isobutyl methacrylate is preferably 2% by weight, more preferably 2.5% by weight, still more preferably 16% by weight, further more preferably 20% by weight, particularly preferably 45% by weight, most preferably 50% by weight. The upper limit thereof is preferably 65% by weight, more preferably 63% by weight, still more preferably 59.5% by weight, further more preferably 55% by weight.

In the acrylic resin, the lower limit of the weight ratio of the amount of the segment derived from methyl methacrylate to the amount of the segment derived from isobutyl methacrylate (amount of segment derived from methyl methacrylate/amount of segment derived from isobutyl methacrylate) is preferably 7/93, more preferably 10/90, still more preferably 15/85, particularly preferably 20/80. The upper limit thereof is preferably 95/5, more preferably 70/30, still more preferably 60/40, particularly preferably 25/75.

When the weight ratio is within the above range, the resulting (meth)acrylic resin can have a sufficiently low decomposition starting temperature.

The (meth)acrylic resin contains a segment derived from a glycidyl group-containing (meth)acrylate.

The presence of the segment derived from a glycidyl group-containing (meth)acrylate allows the resulting laminate to have sufficiently improved strength.

Examples of the glycidyl group-containing (meth)acrylate include glycidyl (meth)acrylate, 4-hydroxybutyl (meth)acrylate glycidyl ether, and 3,4-epoxycyclohexylmethyl (meth)acrylate.

In the (meth)acrylic resin, the lower limit of the amount of the segment derived from a glycidyl group-containing (meth)acrylate is 1% by weight and the upper limit thereof is 10% by weight.

When the amount of the segment derived from a glycidyl group-containing (meth)acrylate is 1% by weight or more, the resulting inorganic fine particle-dispersed sheet can have improved solvent resistance. When such an inorganic fine particle-dispersed sheet is used in production of an all-solid-state battery, an all-solid-battery having excellent electrical properties can be produced. When the amount of the segment derived from a glycidyl group-containing (meth)acrylate is 10% by weight or less, the (meth)acrylic resin can have sufficiently improved decomposability at low temperature.

The lower limit of the amount of the segment derived from a glycidyl group-containing (meth)acrylate is preferably 2% by weight and the upper limit thereof is preferably 7% by weight.

The (meth)acrylic resin contains a segment derived from a (meth)acrylate containing an ester substituent having a carbon number of 8 or more. The expression "containing an ester substituent having a carbon number of 8 or more" means that the total number of carbon atoms other than the carbon atoms constituting the (meth)acryloyl group in the (meth)acrylate is 8 or more.

The presence of the segment derived from a (meth)acrylate containing an ester substituent having a carbon number of 8 or more can sufficiently reduce the decomposition ending temperature of the (meth)acrylic resin, and allows the resulting inorganic fine particle-dispersed sheet to be tough.

In the (meth)actylate containing an ester substituent having a carbon number of 8 or more, the ester substituent preferably has a branched chain structure.

The upper limit of the carbon number of the ester substituent is preferably 30, more preferably 20, still more preferably 10.

Examples of the (meth)acrylate containing an ester substituent having a carbon number of 8 or more include (meth)acrylates containing a straight or branched alkyl group having a carbon number of 8 or more and polyalkylene glycol (meth)acrylates.

Examples of the (meth)acrylate containing a straight or branched alkyl group include 2-ethylhexyl (meth)acrylate, n-nonyl (meth)acrylate, isononyl (meth)acrylate, n-decyl (meth)acrylate, isodecyl (meth)acrylate, n-lauryl (meth)acrylate, isolauryl (meth)acrylate, n-stearyl (meth)acrylate, and isostearyl (meth)acrylate.

Preferred among them are (meth)acrylates having a branched alkyl group having a carbon number of 8 or more. More preferred are 2-ethylhexyl (meth)acrylate, isononyl (meth)acrylate, isodecyl (meth)acrylate, and isostearyl (meth)acrylate.

2-Ethylhexyl methacrylate and isodecyl methacrylate have particularly excellent decomposability compared with other long-chain alkyl methacrylates.

Examples of the polyalkylene glycol (meth)acrylate include those having a unit such as an ethylene glycol unit (oxyethylene unit), a propylene glycol unit (oxypropylene unit), or a butylene glycol unit (oxybutylene unit).

The polyalkylene glycol (meth)acrylate may have an alkoxy group at an end or may have an ethylhexyl group at an end.

Examples of the alkoxy group include methoxy, ethoxy, and butoxy groups. The alkoxy group may be linear or branched, and is preferably branched.

The polyalkylene glycol (meth)acrylate preferably has a branched alkylene glycol structure.

In particular, a polyalkylene glycol (meth)acrylate containing at least one of an ethylene glycol unit, a propylene glycol unit, or a butylene glycol unit is preferred. More preferred are polyethylene glycol methacrylate, ethoxypolypropylene glycol methacrylate, methoxypolypropylene glycol methacrylate, polybutylene glycol methacrylate, and polypropylene glycol-polybutylene glycol methacrylate.

Methoxypolypropylene glycol methacrylate, polypropylene glycol methacrylate, polybutylene glycol methacrylate, and polypropylene glycol-polybutylene glycol methacrylate leave less firing residue and have particularly excellent decomposability at low temperature compared with other alkylene glycol (meth)acrylates.

In the (meth)acrylic resin, the lower limit of the amount of the segment derived from a (meth)acrylate containing an ester substituent having a carbon number of 8 or more is 5% by weight and the upper limit thereof is 40% by weight.

When the amount of the segment derived from a (meth)acrylate containing an ester substituent having a carbon number of 8 or more is 5% by weight or more, the resulting inorganic fine particle-dispersed sheet can have enhanced toughness. When the amount of the segment derived from a (meth)acrylate containing an ester substituent having a carbon number of 8 or more is 40% by weight or less, the (meth)acrylic resin can have a sufficiently low decomposition ending temperature and excellent decomposability at low temperature.

The lower limit of the amount of the segment derived from a (meth)acrylate containing an ester substituent having a carbon number of 8 or more is preferably 10% by weight, more preferably 15% by weight, still more preferably 20% by weight. The upper limit is preferably 39% by weight, more preferably 35% by weight, still more preferably 30% by weight, particularly preferably 25% by weight.

The (meth)acrylic resin may further contain a segment derived from a different (meth)acrylate in addition to the segments derived from the methyl methacrylate, the isobutyl methacrylate, the glycidyl group-containing (meth)acrylate, or the (meth)acrylate containing an ester substituent having a carbon number of 8 or more.

Examples of the different (meth)acrylate include alkyl (meth)acrylates having an alkyl group having a carbon number of 2 to 6, graft monomers containing a polyalkylene ether chain in an ester substituent, polyfunctional (meth)acrylates, and (meth)acrylates containing a hydroxy group or a carboxy group. Preferred among them are alkyl (meth)acrylates containing an alkyl group having a carbon number of 2 to 6 and (meth)acrylates containing a hydroxy group or a carboxy group.

Examples of the (meth)acrylate containing an alkyl group having a carbon number of 2 to 6 include alkyl (meth)acrylates containing a linear alkyl group, alkyl (meth)acrylates containing a branched alkyl group, and alkyl (meth)acrylates containing a cyclic alkyl group.

Examples of the alkyl (meth)acrylate containing a linear alkyl group include ethyl (meth)acrylate, n-propyl (meth)acrylate, n-butyl (meth)acrylate, n-pentyl (meth)acrylate, and n-hexyl (meth)acrylate.

Examples of the alkyl (meth)acrylate containing a branched alkyl group include isopropyl (meth)acrylate, sec-butyl (meth)acrylate, tert-butyl (meth)acrylate, isopentyl (meth)acrylate, neopentyl (meth)acrylate, sec-pentyl (meth)acrylate, and tert-pentyl (meth)acrylate.

Examples of the alkyl (meth)acrylates containing a cyclic alkyl group include cyclohexyl (meth)acrylate.

Preferred among them are alkyl (meth)acrylates containing a linear alkyl group, with n-butyl (meth)acrylate being preferred.

Examples of the graft monomer containing a polyalkylene ether chain in an ester substituent include polytetramethylene glycol monomethacrylate. The examples also include poly(ethylene glycol-polytetramethylene glycol) monomethacrylate, poly(propylene glycol-tetramethylene glycol) monomethacrylate, and propylene glycol-polybutylene glycol monomethacrylate. The examples also include methoxypolytetramethylene glycol monomethacrylate, methoxypoly(ethylene glycol-polytetramethylene glycol) monomethacrylate, methoxypoly(propylene glycol-tetramethylene glycol) monomethacrylate, and methoxypropylene glycol-polybutylene glycol monomethacrylate.

The "polyfunctional (meth)acrylate" means a bi- or higher functional (meth)acrylate.

Examples of the bifunctional (meth)acrylate include tripropylene glycol di(meth)acrylate, polypropylene glycol di(meth)acrylate, diethylene glycol di(meth)acrylate, and polyethylene glycol di(meth)acrylate. The examples also include 1,3-butanediol di(meth)acrylate, 1,4-butanediol di(meth)acrylate, ethoxylated bisphenol A di(meth)acrylate, and ethoxylated bisphenol F di(meth)acrylate. The examples also include 1,6-hexanediol di(meth)acrylate, 1,9-nonanediol di(meth)acrylate, and 1,10-decanediol di(meth)acrylate.

The examples also include glycerin di(meth)acrylate, neopentyl glycol di(meth)acrylate, propoxylated neopentylglycol di(meth)acrylate, and pentaerythritol diacrylate monostearate. Other examples include ethoxy-modified isocyanurate di(meth)acrylate (EO-modified isocyanurate di(meth)acrylate), bifunctional urethane acrylates, and bifunctional polyester acrylates.

Examples of the trifunctional (meth)acrylate include pentaerythritol tri(meth)acrylate and trimethylolpropane tri(meth)acrylate. The examples also include trimethylolpropane EO-modified tri(meth)acrylate and EO-modified isocyanurate tri(meth)acrylate. The examples also include ethoxylated trimethylolpropane tri(meth)acrylate, propoxylated trimethylolpropane tri(meth)acrylate, propoxylated glyceryl tri(meth)acrylate, and trifunctional polyester acrylates.

Examples of the tetrafunctional (meth)acrylate include pentaerythritol tetra(meth)acrylate, ditrimethylolpropane tetra(meth)acrylate, and ethoxylated pentaerythritol tetra(meth)acrylate.

Examples of the penta- or higher functional (meth)acrylate include dipentaerythritol hydroxypenta(meth)acrylate and dipentaerythritol hexa(meth)acrylate.

The (meth)acrylate containing a hydroxy group or a carboxy group is not limited as long as it has a functional group that can react with a glycidyl group-containing (meth) acrylate. Specific examples thereof include 2-hydroxyethyl (meth)acrylate, hydroxypropyl (meth)acrylate, hydroxybutyl (meth)acrylate, and (meth)acrylic acid.

Preferred among them are (meth)acrylates containing a hydroxy group, and 2-hydroxyethyl (meth)acrylate is more preferred.

In the (meth)acrylic resin, the lower limit of the amount of the segment derived from the different (meth)acrylate is preferably 1% by weight, more preferably 5% by weight, still more preferably 10% by weight. The upper limit thereof is preferably 50% by weight, more preferably 45% by weight, still more preferably 40% by weight.

When the amount of the segment derived from the different (meth)acrylate is equal to or more than the preferable lower limit and equal to or less than the preferable upper limit, the resulting (meth)acrylic resin can have sufficiently improved decomposability at low temperature, and the resulting inorganic fine particle-dispersed sheet can be tough.

In the case where the (meth)acrylic resin contains a segment derived from the (meth)acrylate containing an alkyl group having a carbon number of 2 to 6, the lower limit of the amount of the segment derived from the (meth)acrylate containing an alkyl group having a carbon number of 2 to 6 is preferably 1% by weight, more preferably 5% by weight. The upper limit thereof is preferably 40% by weight, more preferably 30% by weight.

In the (meth)acrylic resin, the lower limit of the total amount of the segment derived from isobutyl methacrylate and the segment derived from n-butyl methacrylate and/or the segment derived from ethyl methacrylate is preferably 30% by weight and the upper limit thereof is preferably 92% by weight.

When the total amount is 30% by weight or more, the (meth)acrylic resin can exhibit excellent decomposability at low temperature. When the total amount is 92% by weight or less, the resulting laminate can have sufficiently improved strength.

The lower limit of the total amount is more preferably 40% by weight, still more preferably 65% by weight, particularly preferably 70% by weight. The upper limit thereof is more preferably 92% by weight, still more preferably 90% by weight.

In the (meth)acrylic resin, the lower limit of the amount of the segment derived from n-butyl methacrylate and/or the segment derived from ethyl methacrylate is preferably 4% by weight, more preferably 5% by weight. The upper limit thereof is preferably 42% by weight, more preferably 35% by weight, still more preferably 30% by weight.

In the (meth)acrylic resin, the weight ratio of the amount of the segment derived from n-butyl methacrylate and/or the segment derived from ethyl methacrylate to the amount of the segment derived from isobutyl methacrylate is preferably 7:93 to 60:40, more preferably 7:93 to 25:75, still more preferably 10:90 to 25:75.

When the weight ratio is within the range, the resulting (meth)acrylic resin can have a sufficiently low decomposition starting temperature.

In the case where the (meth)acrylic resin contains a segment derived from the (meth)acrylate containing a hydroxy group or a carboxy group, the lower limit of the amount of the segment derived from the (meth)acrylate containing a hydroxy group or a carboxy group is preferably 1% by weight and the upper limit thereof is preferably 10% by weight.

In the (meth)acrylic resin, the weight ratio of the segment derived from the (meth)acrylate containing a hydroxy group or a carboxy group to the segment having the glycidyl group-containing (meth)acrylate is preferably 10:90 to 90:10.

The lower limit of the weight average molecular weight in terms of polystyrene of the (meth)acrylic resin is preferably 100,000 and the upper limit thereof is preferably 3,000,000. When the weight average molecular weight is 100,000 or more, the inorganic fine particle-dispersed slurry composition can have sufficient viscosity. When the weight average molecular weight is 3,000,000 or less, the printability can be improved.

The lower limit of the weight average molecular weight is more preferably 200,000 and the upper limit thereof is more preferably 1,500,000.

In particular, when the weight average molecular weight in terms of polystyrene of the (meth)acrylic resin is 200,000 to 1,500,000, sufficient viscosity can be advantageously ensured with a small amount of resin by the use of the later-described organic solvent. In addition, an inorganic fine particle-dispersed slurry with less cobwebbing can be obtained.

The ratio (Mw/Mn) of the weight average molecular weight (Mw) to the number average molecular weight (Mn) is preferably 2 or higher and 8 or lower.

When the Mw/Mn is within this range, a component having a low degree of polymerization can be contained in an appropriate amount. The viscosity of the inorganic fine particle-dispersed slurry composition thus can fall within a suitable range, so that the productivity can be enhanced. In addition, the resulting inorganic fine particle-dispersed sheet can have appropriate sheet strength.

When the Mw/Mn is lower than 2, the leveling during application of the green sheet is poor, so that the green sheet may have poor smoothness. When the Mw/Mn is higher than 8, a large amount of a high-molecular-weight component is present. The green sheet thus may be poorly dried and may have poor surface smoothness.

The Mw/Mn is more preferably 3 or higher and 8 or lower.

The weight average molecular weight in terms of polystyrene and the number average molecular weight can be measured by GPC analysis using, for example, a column LF-804 (available from Showa Denko K.K.).

The (meth)acrylic resin preferably has a glass transition temperature (Tg) of 20° C. or higher and 60° C. or lower, more preferably 30° C. or higher and lower than 60° C.

When the glass transition temperature is within the range, the amount of a plasticizer to be added can be reduced, so that the (meth)acrylic resin can have improved decomposability at low temperature.

The Tg can be measured by, for example, a differential scanning calorimeter (DSC).

The lower limit of the glass transition temperature is more preferably 35° C., still more preferably 40° C. The upper limit thereof is more preferably 50° C.

The upper limit of the 90% by weight decomposition temperature of the (meth)acrylic resin in heating at 10° C./min is preferably 280° C.

With such a 90% by weight decomposition temperature, the (meth)acrylic resin can achieve significantly high decomposability at low temperature and thus can reduce the time needed for degreasing.

The lower limit of the 90% by weight decomposition temperature is preferably 230° C., more preferably 250° C. The upper limit thereof is more preferably 270° C.

The 90% by weight decomposition temperature can be measured by, for example, TG-DTA.

The (meth)acrylic resin molded into a sheet form having a thickness of 20 μm preferably has a maximum stress of 20 N/mm$^2$ or more in a tensile test.

The maximum stress can be measured by a tensile test using an autograph.

Since (meth)acrylic resins are usually hard and brittle, when they are molded into a sheet form and pulled, they break at a strain of less than 5%. Thus, no yield value is shown when the (meth)acrylic resin has a formulation that provides a low glass transition temperature.

However, when the formulation of the(meth)acrylic resin in the resin composition of the present invention is adjusted, the (meth)acrylic resin shows yield stress even when molded into a sheet form and pulled. This sheet preferably has a thickness of around 500 μm.

In the resin composition of the present invention, the (meth)acrylic resin preferably contains 20 to 50% by weight of the segment derived from methyl methacrylate, 10 to 39% by weight in total of a segment derived from at least one selected from the group consisting of 2-ethylhexyl methacrylate, isodecyl methacrylate, isononyl methacrylate, isostearyl methacrylate, polyethylene glycol methacrylate containing an ethoxy or ethylhexyl group at an end, and polypropylene glycol methacrylate containing an ethoxy or ethylhexyl group at an end, and 1 to 10% by weight of the segment derived from a glycidyl group-containing (meth) acrylate. Hereinafter, the (meth)acrylic resin may also be referred to as a "(meth)acrylic resin of a first embodiment".

In the (meth)acrylic resin of the first embodiment, the lower limit of the amount of the segment derived from methyl methacrylate is preferably 20% by weight and the upper limit thereof is preferably 50% by weight. When the amount is 20% by weight or more and 50% by weight or less, the (meth)acrylic resin can exhibit excellent decomposability at low temperature and has an increased glass transition temperature, so that a molded article having high rigidity can be produced. The lower limit is more preferably 25% by weight and the upper limit thereof is more preferably 40% by weight.

The (meth)acrylic resin of the first embodiment preferably contains a segment derived from at least one selected from the group consisting of 2-ethylhexyl methacrylate, isodecyl methacrylate, isononyl methacrylate, isostearyl methacrylate, polyethylene glycol methacrylate containing an ethoxy or ethylhexyl group at an end, and polypropylene glycol methacrylate containing an ethoxy or ethylhexyl group at an end. The presence of such a segment can prevent the resulting inorganic fine particle-dispersed sheet from being brittle.

In the (meth)acrylic resin of the first embodiment, the lower limit of the total amount of the segment derived from one selected from the group consisting of 2-ethylhexyl methacrylate, isodecyl methacrylate, isononyl methacrylate, isostearyl methacrylate, polyethylene glycol methacrylate containing an ethoxy or ethylhexyl group at an end, and polypropylene glycol methacrylate containing an ethoxy or ethylhexyl group at an end is preferably 10% by weight. The upper limit thereof is preferably 39% by weight. When the amount is 10% by weight or more and 39% by weight or less, highly excellent decomposability at low temperature can be achieved, and a molded article with reduced brittleness can be produced. The lower limit is more preferably 15% by weight and the upper limit is more preferably 35% by weight.

In the resin composition of the present invention, preferably, the (meth)acrylic resin contains the segment derived from methyl methacrylate, the segment derived from isobutyl methacrylate, the segment derived from a glycidyl group-containing (meth)acrylate, and the segment derived from a (meth)acrylate containing an ester substituent having a carbon number of 8 or more, the total amount of the segment derived from methyl methacrylate and the segment derived from isobutyl methacrylate is 50 to 70% by weight, the amount of the segment derived from a glycidyl group-containing (meth)acrylate is 1 to 10% by weight, the amount of the segment derived from a (meth)acrylate containing an ester substituent having a carbon number of 8 or more is 15 to 40% by weight, the (meth)acrylic resin has a glass transition temperature of 30° C. or higher and lower than 60° C., the (meth)acrylic resin has a weight average molecular weight (Mw) of 100,000 to 3,000,000, and the ratio (Mw/Mn) of the weight average molecular weight (Mw) to the number average molecular weight (Mn) of the (meth)acrylic resin is 2 or higher and 8 or lower. Hereinafter, the (meth) acrylic resin may also be referred to as a "(meth)acrylic resin of a second embodiment".

The (meth)acrylic resin of the second embodiment preferably contains the segment derived from methyl methacrylate and the segment derived from isobutyl methacrylate.

The presence of the segment derived from isobutyl methacrylate allows the (meth)acrylic resin to exhibit excellent decomposability at low temperature. The presence of the segment derived from methyl methacrylate can suppress a reduction of the decomposability of the segment derived from isobutyl methacrylate around 300° C. and thus further improve the decomposability at low temperature.

In the (meth)acrylic resin of the second embodiment, the lower limit of the amount of the segment derived from methyl methacrylate is preferably 5% by weight, more preferably 7.5% by weight. The upper limit thereof is preferably 68% by weight, more preferably 66.5% by weight.

When the amount of the segment derived from methyl methacrylate is 5% by weight or more, a reduction of the decomposability of the segment derived from isobutyl methacrylate around 300° C. can be sufficiently suppressed. When the amount of the segment derived from methyl methacrylate is 68% by weight or less, the (meth)acrylic resin can have a low decomposition starting temperature and exhibit excellent decomposability at low temperature.

In the (meth)acrylic resin of the second embodiment, the lower limit of the amount of the segment derived from isobutyl methacrylate is preferably 2% by weight, more preferably 2.5% by weight. The upper limit thereof is preferably 65% by weight, more preferably 59.5% by weight.

When the amount of the segment derived from isobutyl methacrylate is 2% by weight or more, the (meth)acrylic resin can have a low decomposition starting temperature and exhibit excellent decomposability at low temperature. When the amount of the segment derived from isobutyl methacrylate is 65% by weight or less, the effect of preventing a reduction of the decomposability around 300° C. can be sufficiently exhibited.

In the (meth)acrylic resin of the second embodiment, the weight ratio of the amount of the segment derived from methyl methacrylate to the amount of the segment derived from isobutyl methacrylate is preferably 15:85 to 95:5.

When the weight ratio is within the above range, the resulting (meth)acrylic resin can have a sufficiently low decomposition starting temperature.

The weight ratio is more preferably 20:80 to 70:30.

In the (meth)acrylic resin of the second embodiment, the lower limit of the total amount of the segment derived from methyl methacrylate and the segment derived from isobutyl methacrylate is preferably 50% by weight and the upper limit is preferably 70% by weight.

When the total amount is 50% by weight or more, the (meth)acrylic resin can exhibit excellent decomposability at low temperature. When the total amount is 70% by weight or less, the resulting laminate can have sufficiently improved strength.

The lower limit of the total amount is more preferably 55% by weight and the upper limit thereof is more preferably 65% by weight.

In the (meth)acrylic resin of the second embodiment, the lower limit of the amount of the segment derived from a (meth)acrylate containing an ester substituent having a carbon number of 8 or more is preferably 15% by weight and the upper limit thereof is preferably 40% by weight.

When the amount of the segment derived from a (meth)acrylate containing an ester substituent having a carbon number of 8 or more is 15% by weight or more, the resulting inorganic fine particle-dispersed sheet can be tough. When the amount of the segment derived from a (meth)acrylate containing an ester substituent having a carbon number of 8 or more is 40% by weight or less, the (meth)acrylic resin can have a sufficiently low decomposition ending temperature and excellent decomposability at low temperature.

The lower limit of the amount of the segment derived from a (meth)acrylate containing an ester substituent having a carbon number of 8 or more is more preferably 20% by weight and the upper limit thereof is more preferably 35% by weight.

In the resin composition of the present invention, preferably, the (meth)acrylic resin includes a segment derived from n-butyl methacrylate and/or a segment derived from ethyl methacrylate, and includes the segment derived from isobutyl methacrylate, the segment derived from a glycidyl group-containing (meth)acrylate, and the segment derived from a (meth)acrylate containing an ester substituent having a carbon number of 8 or more, the total amount of the segment derived from n-butyl methacrylate, the segment derived from ethyl methacrylate, and the segment derived from isobutyl methacrylate is 30 to 92% by weight, the amount of the segment derived from a glycidyl group-containing (meth)acrylate is 1 to 10% by weight, the amount of the segment derived from a (meth)acrylate containing an ester substituent having a carbon number of 8 or more is 5 to 30% by weight, the (meth)acrylic resin has a glass transition temperature of 35° C. or higher and lower than 60° C., and the (meth)acrylic resin has a weight average molecular weight of 100,000 to 3,000,000. Hereinafter, the (meth)acrylic resin may also be referred to as a "(meth)acrylic resin of a third embodiment".

The (meth)acrylic resin of the third embodiment preferably contains the segment derived from isobutyl methacrylate. The presence of the segment derived from isobutyl methacrylate allows the (meth)acrylic resin to exhibit excellent decomposability at low temperature. However, isobutyl methacrylate tends to produce soot (residual carbon) in firing. With the presence of a segment derived from n-butyl methacrylate and/or ethyl methacrylate, the residual carbon can be reduced while maintaining the decomposability at low temperature. As a result, a reduction in the decomposability of the segment derived from isobutyl methacrylate around 300° C. can be suppressed, so that the decomposability at low temperature can be further improved. In addition, the brittleness of the isobutyl methacrylate can be reduced.

In the (meth)acrylic resin of the third embodiment, the lower limit of the total amount of the segment derived from isobutyl methacrylate and the segment derived from n-butyl methacrylate and/or the segment derived from ethyl methacrylate is preferably 30% by weight and the upper limit thereof is preferably 92% by weight.

When the total amount is 30% by weight or more, the (meth)acrylic resin can exhibit excellent decomposability at low temperature. When the total amount is 92% by weight or less, the resulting laminate can have sufficiently improved strength.

The lower limit of the total amount is more preferably 40% by weight, still more preferably 65% by weight, particularly preferably 70% by weight. The upper limit thereof is more preferably 92% by weight, still more preferably 90% by weight.

The weight ratio of the amount of the segment derived from n-butyl methacrylate and/or the segment derived from ethyl methacrylate to the amount of the segment derived from isobutyl methacrylate is preferably 7:93 to 60:40, more preferably 7:93 to 25:75, still more preferably 10:90 to 25:75.

When the weight ratio is within the range, the resulting (meth)acrylic resin can have a sufficiently low decomposition starting temperature.

In the (meth)acrylic resin of the third embodiment, the lower limit of the amount of the segment derived from isobutyl methacrylate is preferably 16% by weight, more preferably 20% by weight, still more preferably 45% by weight, particularly preferably 50% by weight. The upper limit thereof is preferably 65% by weight, more preferably 63% by weight, still more preferably 55% by weight.

In the (meth)acrylic resin of the third embodiment, the lower limit of the amount of the segment derived from n-butyl methacrylate and/or the segment derived from ethyl methacrylate is preferably 4% by weight, more preferably 5% by weight. The upper limit thereof is preferably 42% by weight, more preferably 35% by weight, still more preferably 30% by weight.

The (meth)acrylic resin of the third embodiment may further contain the segment derived from methyl methacrylate.

The lower limit of the amount of the segment derived from methyl (meth)acrylate is preferably 5% by weight and the upper limit thereof is preferably 40% by weight.

When the amount is 5% by weight or more, the decomposition temperature can be low. When the amount is 40% by weight or less, the green sheet can have improved handleability.

The lower limit of the amount is more preferably 15% by weight. The upper limit thereof is more preferably 35% by weight, still more preferably 20% by weight.

The resin composition of the present invention may be produced by any method. In an exemplary method, a raw material monomer mixture containing methyl methacrylate, isobutyl methacrylate, a glycidyl group-containing (meth)acrylate, a (meth)acrylate containing an ester substituent having a carbon number of 8 or more, and the like is mixed with an organic solvent and the like to prepare a monomer mixture. A polymerization initiator is added to the obtained monomer mixture, and the raw material monomers are copolymerized.

Any polymerization method may be used. Examples thereof include emulsion polymerization, suspension polymerization, bulk polymerization, interfacial polymerization, and solution polymerization. In particular, solution polymerization is preferred.

Examples of the polymerization initiator include β-menthane hydroperoxide, diisopropylbenzene hydroperoxide, 1,1,3,3-tetramethylbutyl hydroperoxide, cumene hydroperoxide, t-butyl hydroxyperoxide, cyclohexanone peroxide, and disuccinic acid peroxide.

Commercially available examples thereof include PERMENTA H, PERCUMYL P, PEROCTA H, PERCUMYL H-80, PERBUTYL H-69, PERHEXA H, and PEROYL SA (all available from NOF Corporation).

An inorganic fine particle-dispersed slurry composition can be produced using the resin composition of the present invention, inorganic fine particles, an organic solvent, and a plasticizer.

The present invention also encompasses an inorganic fine particle-dispersed slurry composition containing the resin composition of the present invention, inorganic fine particles, an organic solvent, and a plasticizer.

The inorganic fine particle-dispersed slurry composition of the present invention contains an organic solvent.

Any organic solvent may be used. The organic solvent is preferably excellent in coating properties, drying properties, inorganic powder dispersibility, and the like during production of the inorganic fine particle-dispersed sheet.

Examples thereof include toluene, ethyl acetate, butyl acetate, isopropanol, methyl isobutyl ketone, methyl ethyl ketone, methyl isobutyl ketone, ethylene glycol ethyl ether, ethylene glycol monobutyl ether, ethylene glycol monoethyl ether acetate, diethylene glycol monoethyl ether, diethylene glycol monomethyl ether, diethylene glycol monoisobutyl ether, trimethylpentanediol monoisobutyrate, butyl carbitol, butyl carbitol acetate, terpineol, terpineol acetate, dihydroterpineol, dihydroterpineol acetate, texanol, isophorone, butyl lactate, dioctyl phthalate, dioctyl adipate, benzyl alcohol, phenyl propylene glycol, and cresol. Preferred among them are terpineol, terpineol acetate, dihydroterpineol, dihydroterpineol acetate, diethylene glycol monoethyl ether, diethylene glycol monomethyl ether, diethylene glycol monoisobutyl ether, butyl carbitol, butyl carbitol acetate, and texanol. More preferred are terpineol, terpineol acetate, dihydroterpineol, and dihydroterpineol acetate. These organic solvents may be used alone or in combination of two or more.

The organic solvent preferably has a boiling point of 90° C. to 160° C. When the boiling point is 90° C. or higher, the organic solvent is not evaporated too early and thus has excellent handleability. When the boiling point is 160° C. or lower, the inorganic fine particle-dispersed sheet can have improved strength.

The amount of the organic solvent in the inorganic fine particle-dispersed slurry composition of the present invention is not limited. The lower limit thereof is preferably 10% by weight and the upper limit thereof is preferably 60% by weight. When the amount is within the above range, the coating properties and the inorganic fine particle dispersibility can be improved.

The inorganic fine particle-dispersed slurry composition of the present invention contains inorganic fine particles.

Any inorganic fine particles may be used. Examples thereof include glass powder, ceramic powder, phosphor fine particles, silicon oxide, and metal fine particles.

Any glass powder may be used. Examples thereof include powders of glass such as bismuth oxide glass, silicate glass, lead glass, zinc glass, or boron glass, and various silicon oxide glass powders such as $CaO$—$Al_2O_3$—$SiO_2$ glass powder, $MgO$—$Al_2O_3$—$SiO_2$ glass powder, and $LiO_2$—$Al_2O_3$—$SiO_2$ glass powder.

Usable glass powders also include $SnO$—$B_2O_3$—$P_2O_5$—$Al_2O_3$ mixtures, $PbO$—$B_2O_3$—$SiO_2$ mixtures, $BaO$—$ZnO$—$B_2O_3$—$SiO_2$ mixtures, $ZnO$—$Bi_2O_3$—$B_2O_3$—$SiO_2$ mixtures, $Bi_2O_3$—$B_2O_3$—$BaO$—$CuO$ mixtures, $Bi_2O_3$—$ZnO$—$B_2O_3$—$Al_2O_3$—$SrO$ mixtures, $ZnO$—$Bi_2O_3$—$B_2O_3$ mixtures, $Bi_2O_3$—$SiO_2$ mixtures, $P_2O_5$—$Na_2O$—$CaO$—$BaO$—$Al_2O_3$—$B_2O_3$ mixtures, $P_2O_5$—$SnO$ mixtures, $P_2O_5$—$SnO$—$B_2O_3$ mixtures, $P_2O_5$—$SnO$—$SiO_2$ mixtures, $CuO$—$P_2O_5$—$RO$ mixtures, $SiO_2$—$B_2O_3$—$ZnO$—$Na_2O$—$Li_2O$—$NaF$—$V_2O_5$ mixtures, $P_2O_5$—$ZnO$—$SnO$—$R_2O$—$RO$ mixtures, $B_2O_3$—$SiO_2$—$ZnO$ mixtures, $B_2O_3$—$SiO_2$—$Al_2O_3$—$ZrO_2$ mixtures, $SiO_2$—$B_2O_3$—$ZnO$—$R_2O$—$RO$ mixtures, $SiO_2$—$B_2O_3$—$Al_2O_3$—$RO$—$R_2O$ mixtures, $SrO$—$ZnO$—$P_2O_5$ mixtures, $SrO$—$ZnO$—$P_2O_5$ mixtures, and $BaO$—$ZnO$—$B_2O_3$—$SiO_2$ mixtures. R is an element selected from the group consisting of Zn, Ba, Ca, Mg, Sr, Sn, Ni, Fe, and Mn.

Particularly preferred are $PbO$—$B_2O_3$—$SiO_2$ mixture glass powders and lead-free glass powders such as $BaO$—$ZnO$—$B_2O_3$—$SiO_2$ mixtures or $ZnO$—$Bi_2O_3$—$B_2O_3$—$SiO_2$ mixtures.

Any ceramic powder may be used. Examples thereof include alumina, ferrite, zirconia, zircon, barium zirconate, calcium zirconate, titanium oxide, barium titanate, strontium titanate, calcium titanate, magnesium titanate, zinc titanate, lanthanum titanate, neodymium titanate, lead zirconate titanate, alumina nitride, silicon nitride, boron nitride, boron carbide, barium stannate, calcium stannate, magnesium silicate, mullite, steatite, cordierite, and forsterite.

Usable ceramic powders also include ITO, FTO, niobium oxide, vanadium oxide, tungsten oxide, lanthanum strontium manganite, lanthanum strontium cobalt ferrite, yttrium-stabilized zirconia, gadolinium-doped ceria, nickel oxide, and lanthanum chromite.

Any phosphor fine particles may be used. For example, the phosphor may be a blue phosphor, a red phosphor, or a green phosphor conventionally known as a phosphor for displays. Examples of the blue phosphor include $MgAl_{10}O_{17}$:Eu phosphors, $Y_2SiO_5$:Ce phosphors, $CaWO_4$:Pb phosphors, $BaMgAl_{14}O_{23}$:Eu phosphors, $BaMgAl_6O_{27}$:Eu phosphors, $BaMg_2Al_{14}O_{23}$:Eu phosphors, $BaMg_2Al_{14}O_{27}$:Eu phosphors, and ZnS: (Ag,Cd) phosphors. Examples of the red phosphor include $Y_2O_3$:Eu phosphors, $Y_2SiO_5$:Eu phosphors, $Y_3Al_5O_{12}$:Eu phosphors, $Zn_3(PO_4)_2$:Mn phosphors, $YBO_3$:Eu phosphors, $(Y,Gd)BO_3$:Eu phosphors, $GdBO_3$:Eu phosphors, $ScBO_3$:Eu phosphors, and $LuBO_3$:Eu phosphors. Examples of the green phosphor include $Zn_2SiO_4$:Mn phosphors, $BaAl_{12}O_{19}$:Mn phosphors, $SrAl_{13}O_{19}$: Mn phosphors, $CaAl_{12}O_{19}$: Mn phosphors, $YBO_3$:Tb phosphors, $BaMgAl_{14}O_{23}$: Mn phosphors, $LuBO_3$:Tb phosphors, $GdBO_3$:Tb phosphors, $ScBO_3$:Tb phosphors, and $Sr_6Si_3O_3Cl_4$:Eu phosphors. Other usable phosphors include ZnO:Zn phosphors, ZnS: (Cu,Al) phosphors, ZnS:Ag phosphors, $Y_2O_2S$:Eu phosphors, ZnS:Zn phosphors, $(Y,Cd)BO_3$:Eu phosphors, and $BaMgAl_{12}O_{23}$:Eu phosphors.

Any metal fine particles may be used. Examples thereof include powders of copper, nickel, palladium, platinum, gold, silver, aluminum, and tungsten, and alloys thereof.

Metals such as copper and iron have good adsorption properties with a carboxy group, an amino group, an amide group, and the like, and are easily oxidized. Such metals can also be suitably used. These metal powders may be used alone or in combination of two or more.

A metal complex, any of various carbon blacks and carbon nanotubes, or the like may be used.

The inorganic fine particles preferably contain lithium or titanium. Specific examples include low-melting glass such as $LiO_2$—$Al_2O_3$—$SiO_2$ inorganic glass, lithium sulfur glass such as $Li_2S$-$M_xS_y$ (M=B, Si, Ge, or P), lithium cobalt complex oxides such as $LiCeO_2$, lithium manganese complex oxides such as $LiMnO_4$, lithium nickel complex oxides, lithium vanadium complex oxides, lithium zirconium complex oxides, lithium hafnium complex oxides, lithium silicophosphate ($Li_{3.5}Si_{0.5}P_{0.5}O_4$), titanium lithium phosphate ($LiTi_2(PO_4)_3$), lithium titanate ($Li_4Ti_5O_{12}$), $Li_{4/3}Ti_{5/3}O_4$, $LiCoO_2$, germanium lithium phosphate ($LiGe_2 (PO_4)_3$), $Li_2$—SiS glass, $Li_4GeS_4$—$Li_3PS_4$ glass, $LiSiO_3$, $LiMn_2O_4$, $Li_2S$—$P_2S_5$ glass/ceramics, $Li_2O$—$SiO_2$, $Li_2O$—$V_2O$—$SiO_2$, LiS—$SiS_2$—$Li_4SiO_4$ glass, ion conductive oxide such as LiPON, lithium oxide compounds such as $Li_2O$—$P_2O_5$—$B_2O_3$ and $Li_2O$—$GeO_2Ba$, $Li_xAl_yTi_z(PO_4)_3$ glass, $La_xLi_y$-$TiO_z$ glass, $Li_xGe_yP_zO_4$ glass, $Li_7La_3Zr_2O_{12}$ glass, $Li_vSi_wP_xS_yCl_z$ glass, lithium niobium oxides such as $LiNbO_3$, lithium alumina compounds such as Li-β-alumina, and lithium zinc oxides such as $Li_{14}Zn(GeO_4)_4$.

The amount of the inorganic fine particles in the inorganic fine particle-dispersed slurry composition of the present invention is not limited. The lower limit thereof is preferably 10% by weight and the upper limit thereof is preferably 90% by weight. When the amount is 10% by weight or more, the inorganic fine particle-dispersed slurry composition can have sufficient viscosity and excellent coating properties. When the amount is 90% by weight or less, excellent inorganic fine particle dispersibility can be obtained.

The inorganic fine particle-dispersed slurry composition of the present invention contains a plasticizer.

Examples of the plasticizer include di(butoxyethyl) adipate, dibutoxyethoxyethyl adipate, triethylene glycol bis(2-ethylhexanoate), triethylene glycol dihexanoate, tributyl acetylcitrate, and dibutyl sebacate.

Use of any of these plasticizers can reduce the addition amount of the plasticizer compared with the case of using a conventional plasticizer (an addition amount of about 30% by weight relative to the binder can be reduced to 25% by weight or less, or further to 20% by weight or less).

In particular, a non-aromatic plasticizer is preferably used. The plasticizer more preferably contains a component derived from adipic acid, triethylene glycol or citric acid. Plasticizers containing an aromatic ring are not preferable because they easily produce soot when burnt.

The plasticizer preferably contains an alkyl group having a carbon number of 4 or more.

The plasticizer containing an alkyl group having a carbon number of 4 or more can suppress absorption of moisture into the plasticizer, and thus can prevent trouble such as voids and swelling in the resulting inorganic fine particle-dispersed sheet. In particular, the alkyl group of the plasticizer is preferably positioned at a molecular end.

The plasticizer preferably has a carbon:oxygen ratio of 5:1 to 3:1.

When the carbon:oxygen ratio is within the above range, the plasticizer can have improved combustibility and prevent production of residual carbon. In addition, the plasticizer can have improved compatibility with the (meth)acrylic resin and exhibit a plasticizing effect even when used in a small amount.

Even a high-boiling-point organic solvent having a propylene glycol skeleton or a trimethylene glycol skeleton can be suitably used as long as it contains an alkyl group having a carbon number of 4 or more and a carbon:oxygen ratio of 5:1 to 3:1.

The plasticizer preferably has a boiling point of 240° C. or higher and lower than 390° C. When the boiling point is 240° C. or higher, the plasticizer is easily evaporated in a drying step, so that remaining of the plasticizer in the molded article can be prevented. When the boiling point is lower than 390° C., production of residual carbon can be prevented. The boiling point means a boiling point at normal pressure.

The amount of the plasticizer in the inorganic fine particle-dispersed slurry composition of the present invention is not limited. The lower limit thereof is preferably 0.1% by weight and the upper limit thereof is preferably 3.0% by weight. When the amount is within this range, the firing residue of the plasticizer can be reduced.

The amount of the (meth)acrylic resin in the inorganic fine particle-dispersed slurry composition of the present invention is not limited. The lower limit thereof is preferably 5% by weight and the upper limit thereof is preferably 30% by weight.

When the amount of the (meth)acrylic resin is within the above range, the inorganic fine particle-dispersed slurry composition can be degreased even by firing at low temperature.

The lower limit of the amount of the (meth)acrylic resin is more preferably 6% by weight and the upper limit thereof is more preferably 12% by weight.

The inorganic fine particle-dispersed slurry composition of the present invention may contain an additive such as a surfactant.

Any surfactant may be used. Examples thereof include cationic surfactants, anionic surfactants, and nonionic surfactants.

The nonionic surfactant may be any nonionic surfactant, but is preferably a nonionic surfactant having a HLB value of 10 or more and 20 or less. The "HLB value" herein is used as an index of the hydrophilicity and the lipophilicity of the surfactant. Several calculation methods have been proposed. In an exemplary method, the HLB value for ester surfactants is defined by 20(1-S/A), where S is the saponification value and A is the acid value of fatty acid constituting the surfactant. Specific suitable examples of the surfactant include nonionic surfactants containing polyethylene oxide in which an alkylene ether is added to an aliphatic chain. Specific suitable examples thereof include polyoxyethylene lauryl ether and polyoxyethylene cetyl ether. Here, although the nonionic surfactant has good thermal decomposability, adding it in a large amount may reduce the thermal decomposability of the inorganic fine particle-dispersed slurry composition. The upper limit of the amount of the surfactant is thus preferably 5% by weight.

The inorganic fine particle-dispersed slurry composition of the present invention may have any viscosity. The lower limit of the viscosity measured at 20° C. using a B-type viscometer at a probe rotation frequency of 5 rpm is preferably 0.1 Pa·s and the upper limit thereof is preferably 100 Pa·s.

When the viscosity is 0.1 Pa·s or higher, after the inorganic fine particle-dispersed slurry composition is applied by a die-coating printing method or the like, the resulting inorganic fine particle-dispersed sheet can maintain a predetermined shape. When the viscosity is 100 Pa·s or lower, trouble such as remaining of die discharge marks can be prevented, and excellent printability can be obtained.

The inorganic fine particle-dispersed slurry composition of the present invention may be produced by any method, and may be produced by a conventionally known stirring method. Specifically, in an exemplary method, the (meth) acrylic resin, the plasticizer, the inorganic fine particles, the organic solvent, and optionally other components are stirred with a triple roll mill or the like.

An inorganic fine particle-dispersed sheet can be produced by applying the inorganic fine particle-dispersed slurry composition of the present invention to a support film whose one side is released-treated, and drying the organic solvent to shape the composition into a sheet form. The present invention also encompasses such an inorganic fine particle-dispersed sheet.

The inorganic fine particle-dispersed sheet of the present invention preferably has a thickness of 1 to 20 μm.

The inorganic fine particle-dispersed sheet of the present invention may be produced by, for example, a method including applying the inorganic fine particle-dispersed slurry composition of the present invention to a support film with a coating system such as a roll coater, a die coater, a squeeze coater, or a curtain coater to uniformly form a coating film on the support film.

When the inorganic fine particle-dispersed sheet is produced, the polymerization solution is preferably used as-is as the inorganic fine particle-dispersed slurry composition and processed into the inorganic fine particle-dispersed sheet without drying the (meth)acrylic resin.

This is because drying the (meth)acrylic resin results in occurrence of undried particles when the (meth)acrylic resin is again formed into a solution. Such particles are difficult to remove even by filtration using a cartridge filter and adversely affect the strength of the inorganic fine particle-dispersed sheet.

The support film used in production of the inorganic fine particle-dispersed sheet of the present invention is preferably a resin film having flexibility as well as heat resistance and solvent resistance. When the support film has flexibility, the inorganic fine particle-dispersed slurry composition can be applied to the support film with a roll coater, a blade coater, or the like, and the resulting film with the formed inorganic fine particle-dispersed sheet can be stored and supplied in the form of a wound roll.

Examples of the resin forming the support film include polyethylene terephthalate, polyester, polyethylene, polypropylene, polystyrene, polyimide, polyvinyl alcohol, polyvinyl chloride, fluororesin such as polyfluoroethylene, nylon, and cellulose.

The support film preferably has a thickness of, for example, 20 to 100 μm.

A surface of the support film is preferably release-treated. Such a treatment allows easy separation of the support film in a transcribing step.

An all-solid-state battery can be produced by using the inorganic fine particle-dispersed slurry composition and inorganic fine particle-dispersed sheet of the present invention as materials of a positive electrode, a solid electrolyte, and a negative electrode of the all-solid-state battery. A multilayer ceramic capacitor can be produced by using the inorganic fine particle-dispersed slurry composition and inorganic fine particle-dispersed sheet of the present invention for dielectric green sheets and an electrode paste. The present invention encompasses such all-solid-state battery and multilayer ceramic capacitor.

The method for producing an all-solid-state battery of the present invention preferably includes: preparing an electrode active material sheet by molding a slurry for an electrode active material layer, the slurry containing an electrode active material and a binder for an electrode active material layer; laminating the electrode active material sheet and the inorganic fine particle-dispersed sheet of the present invention to prepare a laminate; and firing the laminate.

Any electrode active material may be used. For example, the same inorganic fine particles as described above may be used.

The binder for an electrode active material layer may be the (meth)acrylic resin described above.

The electrode active material sheet and the inorganic fine particle-dispersed sheet of the present invention may be laminated by performing, after forming the respective sheets, thermal pressure bonding by hot press or performing thermal lamination.

In the firing step, the lower limit of the heating temperature is preferably 250° C. and the upper limit thereof is preferably 350° C.

The all-solid-state battery can be obtained by the above production method.

The all-solid-state battery preferably has a laminated structure including a positive electrode layer containing a positive electrode active material, a negative electrode layer containing a negative electrode active material, and a solid electrolyte layer formed between the positive electrode layer and the negative electrode layer.

The method for producing a multilayer ceramic capacitor of the present invention preferably includes: preparing dielectric sheets by printing and drying a conductive paste on the inorganic fine particle-dispersed sheet of the present invention; and laminating the dielectric sheets.

The conductive paste contains a conductive powder.

The conductive powder may be formed of any material that has conductivity. Examples thereof include nickel, palladium, platinum, gold, silver, copper, and alloys thereof. These conductive powders may be used alone or in combination of two or more.

The binder resin and organic solvent used in the conductive paste may be the same as those for the inorganic fine particle-dispersed slurry composition of the present invention.

In particular, the binder resin is preferably the resin composition of the present invention.

The conductive paste may be printed by any method. Examples of the method include a screen printing method, a die-coating printing method, an offset printing method, a gravure printing method, and an ink-jet printing method.

In the method for producing a multilayer ceramic capacitor of the present invention, a multilayer ceramic capacitor can be obtained by laminating the dielectric sheets on which the conductive paste is printed.

Advantageous Effects of Invention

The present invention can provide a resin composition which has excellent decomposability at low temperature, can provide a molded article having high strength, and enables an increase in the number of layers and thinning so as to enable production of an all-solid-state battery and a ceramic laminate (e.g., a multilayer ceramic capacitor) having excellent properties. The present invention can also provide an inorganic fine particle-dispersed slurry composition containing the resin composition, an inorganic fine particle-dispersed sheet, a method for producing an all-solid-state battery, and a method for producing a multilayer ceramic capacitor.

DESCRIPTION OF EMBODIMENTS

The present invention is more specifically described in the following with reference to, but not limited to, examples.

Example 1

(1) Preparation of Resin Composition

A 2-L separable flask equipped with a stirrer, a condenser, a thermometer, a water bath, and a nitrogen gas inlet was provided. The 2-L separable flask was charged with monomers in amounts shown in Table 1. Then, the monomers were mixed with 100 parts by weight of butyl acetate as an organic solvent to give a monomer mixture.

The following monomers were used.
MMA: methyl methacrylate
iBMA: isobutyl methacrylate
iDMA: isodecyl methacrylate (carbon number of ester substituent: 10)
GMA: glycidyl methacrylate
BMA: n-butyl methacrylate
HEMA: 2-hydroxyethyl methacrylate The obtained monomer mixture was bubbled with nitrogen gas for 20 minutes to remove dissolved oxygen. Thereafter, the separable flask system was purged with nitrogen gas, and the temperature was raised with stirring until the water bath came to a boil. A solution obtained by diluting a polymerization initiator in butyl acetate was added. During polymerization, the solution containing the polymerization initiator in butyl acetate was added several times.

Seven hours after the start of the polymerization, the contents of the flask was cooled to room temperature to complete the polymerization. Thus, a resin composition containing a (meth)acrylic resin was obtained.

(2) Preparation of Inorganic Fine Particle-Dispersed Slurry Composition

To 40 parts by weight of the obtained resin composition were added $Li_2S$—$P_2S_5$ glass (average particle size: 2.0 μm) as inorganic fine particles, di(butoxyethyl) adipate as a plasticizer, and butyl acetate as a solvent in amounts shown in Table 1. The mixture was kneaded with a high-speed stirrer to give an inorganic fine particle-dispersed slurry composition.

(3) Preparation of Inorganic Fine Particle-Dispersed Sheet

The obtained inorganic fine particle-dispersed slurry composition was applied using a blade coater to a release-treated polyethylene terephthalate (PET) support film (width: 400 mm, length: 30 m, thickness 38 μm). The formed coating film was dried at 40° C. for 10 hours to remove the solvent, whereby an inorganic fine particle-dispersed sheet having a thickness of 50 μm was formed on the support film.

(4) Preparation of all-Solid-State Battery

The obtained inorganic fine particle-dispersed sheet was separated from the support film. Indium metallic foil as a negative electrode was bonded to the inorganic fine particle-dispersed sheet to give a negative electrode/solid electrolyte laminated sheet.

To 40 parts by weight of a solution of the (meth)acrylic resin obtained in "(1) Preparation of resin composition" in butyl acetate were added 50 parts by weight in total of the following materials: 20 parts by weight of $LiCoO_2$ (average particle size: 1 μm) as inorganic fine particles, 27 parts by weight of $Li_2S$—$P_2S_5$ glass (average particle size: 2.0 μm), and 3 parts by weight of acetylene black (primary particle size: 35 nm) as a conductive aid. Thereafter, 10 parts by weight of di(butoxyethyl) adipate as a plasticizer was added, and the mixture was kneaded with a high-speed stirrer to give an inorganic fine particle-dispersed slurry composition for a positive electrode.

A positive electrode sheet was prepared using the obtained inorganic fine particle-dispersed slurry composition for a positive electrode in the same manner as in "(3) Preparation of inorganic fine particle-dispersed sheet".

The obtained positive electrode sheet was bonded to the negative electrode/solid electrolyte laminated sheet using a laminator to give a negative electrode/solid electrolyte/positive electrode laminated sheet.

A piece having a size of 2 cm×1 cm was punched out of the obtained laminated sheet. The piece was fired on an alumina substrate for six hours in an electric furnace set at 300° C. to remove the binder and the plasticizer. Thus, a glass laminate was obtained.

Then, 20 parts by weight of the resin composition obtained in "(1) Preparation of resin composition" was kneaded with 10 parts by weight of low-melting-point glass frit (average particle size: 2 μm), 70 parts by weight of silver palladium particles (average particle size: 1 μm), and 50 parts by weight of terpineol as a plasticizer using a high-speed stirrer, whereby an electrode slurry composition was obtained.

Next, the ends of the obtained glass laminate were brought into contact with the electrode slurry composition to form collector electrodes. The glass laminate was then fired at a 300° C. oven for one hour to degrease the electrodes, whereby an all-solid-state battery was obtained.

Examples 2 to 27 and Comparative Examples 1 to 18

A resin composition, an inorganic fine particle-dispersed slurry composition, an inorganic fine particle-dispersed sheet, and an all-solid-state battery were prepared as in Example 1 except that in "(1) Preparation of resin composition", monomers were mixed in amounts shown in Tables 1 and 2 and the formulations of the (meth)acrylic resin and the plasticizer were as shown in Tables 1 and 2.

The following monomers were used.
2EHMA: 2-ethylhexyl methacrylate (carbon number of ester substituent: 8)
iNMA: isononyl methacrylate (carbon number of ester substituent: 9)
LMA: lauryl methacrylate (carbon number of ester substituent: 12)

iSMA: isostearyl methacrylate (carbon number of ester substituent: 18)
PEOMA: polyethylene glycol methacrylate (carbon number of ester substituent: 8)
EPOMA: ethoxypolypropylene glycol methacrylate (carbon number of ester substituent: 11)
MPOMA: methoxytriisopropylene glycol methacrylate (carbon number of ester substituent: 10)
MPPMA: methoxypolypropylene glycol methacrylate (carbon number of ester substituent: 10)
BEOMA: isobutoxydiethylene glycol methacrylate (carbon number of ester substituent: 8)
PPBMA: polypropylene glycol-polybutylene glycol methacrylate (carbon number of ester substituent: 27)
ECHMA: 3,4-epoxycyclohexylmethyl methacrylate HBAG: 4-hydroxybutyl acrylate glycidyl ether
MAA: methyl acrylate
EMA: ethyl methacrylate In Comparative Examples 7, 9, 15, and 16, the obtained resin compositions were brittle, and the coating films were shattered before drying in "(3) Preparation of inorganic fine particle-dispersed sheet". The inorganic fine particle-dispersed sheet thus could not be prepared, so that the all-solid-state battery could not be prepared.

In Comparative Examples 8, 10, and 18, the inorganic fine particle-dispersed sheets lacked resilience and broke when they were separated from the support film in "(4) Preparation of all-solid-state battery". The all-solid-state battery thus could not be prepared.

Examples 28 to 31 and Comparative Examples 19 to 22

(5) Preparation of Conductive Paste

The resin composition obtained in Example 1 was dried, and dissolved in a terpineol solvent to a resin solid content of 11% by weight to give a resin composition solution. To 44 parts by weight of the obtained resin composition solution were added 1 part by weight of oleic acid as a dispersant and 55 parts by weight of nickel powder ("NFP201", JFE Mineral Co., Ltd.) as conductive fine particles. The components were mixed with a triple roll mill to give a conductive paste.

(6) Preparation of Ceramic Green Sheet

The resin compositions obtained in Examples 1, 6, 9, and 19 and Comparative Examples 1, 3, 5, and 14, barium titanate ("BT-02", available from Sakai Chemical Industry Co., Ltd., average particle size: 0.2 μm) as inorganic fine particles, and butyl acetate as a solvent were used. The (meth)acrylic acid resin, a plasticizer, the solvent, and the inorganic fine particles were added according to the formulation in Table 3 and mixed with a ball mill to give an inorganic fine particle-dispersed slurry composition.

The obtained inorganic fine particle-dispersed slurry was applied to a release-treated polyester film to a dry thickness of 1 μm. The applied slurry was dried at room temperature for one hour, followed by drying at 80° C. for 3 hours with a hot air drier and then by drying at 120° C. for two hours. Thus, a ceramic green sheet was prepared.

(7) Preparation of Ceramic Fired Body

The obtained conductive paste was applied to one surface of the obtained ceramic green sheet to a dry thickness of 1.5 μm by a screen printing method. The paste was dried to form a conductive layer, whereby a ceramic green sheet with a conductive layer was obtained. The obtained ceramic green sheet with a conductive layer was cut to a 5-cm square. One hundred 5-cm square ceramic green sheets were stacked together and pressure-bonded with heat for 10 minutes under the conditions of a temperature of 70° C. and a pressure of 150 kg/cm$^2$, whereby a laminate was obtained. The obtained laminate was heated in a nitrogen atmosphere to 400° C. at a temperature increase rate of 3° C./min, held at the temperature for five hours, then heated to 1,350° C. at a temperature increase rate of 5° C./min, and held at the temperature for 10 hours. Thus, a ceramic fired body was prepared.

In Comparative Examples 19 and 20, the ceramic green sheets could not be stacked together, so that the ceramic fired body could not be prepared.

TABLE 1

| | (Meth)acrylic resin formulation (% by weight) | | | | | | | | | | | | |
|---|---|---|---|---|---|---|---|---|---|---|---|---|---|
| | Component derived from MMA | Component derived from iBMA | Total amount of MMA and iBMA | Component derived from (meth)acrylate containing ester substituent having carbon number of 8 or more (carbon number of ester substituent) | | | | | | | | | |
| | | | | 2EHMA (8) | iNMA (9) | iDMA (10) | iSMA (18) | EPOMA (11) | MPOMA (10) | MPPMA (10) | BEOMA (8) | PPBMA (27) | Total |
| Example 1 | 45 | 15 | 60 | — | — | — | — | — | — | — | — | — | 10 |
| Example 2 | 50 | — | 50 | — | — | 39 | — | — | — | — | — | — | 39 |
| Example 3 | 20 | 30 | 50 | 10 | — | — | — | — | — | — | — | — | 10 |
| Example 4 | 42 | — | 42 | — | 20 | — | — | — | — | — | — | — | 20 |
| Example 5 | 50 | — | 50 | — | — | — | 10 | — | — | — | — | — | 10 |
| Example 6 | 40 | — | 40 | — | — | — | — | 10 | — | — | — | — | 10 |
| Example 7 | 20 | 34 | 54 | — | 10 | — | — | — | — | — | — | — | 10 |
| Example 8 | 7.5 | 42.5 | 50 | — | 25 | — | — | — | — | — | — | — | 25 |
| Example 9 | 21.7 | 48.3 | 70 | 24 | — | — | — | — | — | — | — | — | 24 |
| Example 10 | 47.5 | 2.5 | 50 | 23 | — | — | — | — | — | — | — | — | 23 |
| Example 11 | 63 | 7 | 70 | — | — | 28 | — | — | — | — | — | — | 28 |
| Example 12 | 8 | 59 | 67 | — | — | — | 19 | — | — | — | — | — | 19 |
| Example 13 | 53 | 3 | 56 | — | — | — | — | — | 38 | — | — | — | 38 |
| Example 14 | 63 | 7 | 70 | — | — | — | — | — | — | — | 23 | — | 23 |
| Example 15 | 20 | 48 | 68 | — | — | — | — | — | 15 | — | — | — | 15 |
| Example 16 | — | 63 | 63 | 26 | — | — | — | — | — | — | — | — | 26 |
| Example 17 | — | 40 | 40 | 28 | — | — | — | — | — | — | — | — | 28 |
| Example 18 | — | 30 | 30 | 22 | — | — | — | — | — | — | — | — | 22 |
| Example 19 | — | 20 | 20 | 24 | — | — | — | — | — | — | — | — | 24 |
| Example 20 | 16 | 16 | 32 | 30 | — | — | — | — | — | — | — | — | 30 |
| Example 21 | — | 50 | 50 | 25 | — | — | — | — | — | — | — | — | 25 |
| Example 22 | 10 | 30 | 40 | 15 | — | — | — | — | — | — | — | — | 15 |
| Example 23 | 15 | 20 | 35 | 20 | — | — | — | — | — | — | — | — | 20 |
| Example 24 | — | 60 | 60 | — | — | — | — | — | — | — | — | 5 | 5 |
| Example 25 | — | 65 | 65 | — | — | — | — | — | — | 10 | — | — | 10 |
| Example 26 | 10 | 60 | 70 | — | — | — | — | — | — | — | — | 5 | 5 |
| Example 27 | 7 | 60 | 67 | — | — | — | — | — | — | — | — | 5 | 5 |

| | (Meth)acrylic resin formulation (% by weight) | | | | | | | Inorganic fine particle-dispersed slurry composition (% by weight) | | | |
|---|---|---|---|---|---|---|---|---|---|---|---|
| | Component derived from glycidyl group-containing (meth)acrylate | | | Component derived from other monomers | | | Resin component | Plasticizer | | Organic solvent | Inorganic fine particle |
| | GMA | ECHMA | HBAG | EMA | BMA | HEMA | | Type | Amount | | |
| Example 1 | 5 | — | — | — | 20 | 5 | 10 | Di(butoxyethyl) adipate | 0.2 | 54.8 | 35 |
| Example 2 | 6 | — | — | — | — | 5 | 10 | Triethylene glycol bis(2-ethylhexanoate) | 0.2 | 54.8 | 35 |
| Example 3 | 5 | — | — | — | 30 | 5 | 10 | Tributyl acetylcitrate | 0.2 | 54.8 | 35 |
| Example 4 | 4 | — | — | — | 30 | 4 | 10 | Di(butoxyethyl) adipate | 1.2 | 53.8 | 35 |

TABLE 1-continued

| Example | C1 | C2 | C3 | C4 | C5 | C6 | Plasticizer | V1 | V2 | V3 |
|---|---|---|---|---|---|---|---|---|---|---|
| Example 5 | 1 | — | — | 36 | 3 | 10 | Triethylene glycol bis(2-ethylhexanoate) | 1.2 | 53.8 | 35 |
| Example 6 | 10 | — | — | 40 | — | 10 | Triethylene glycol dihexanoate | 1.2 | 53.8 | 35 |
| Example 7 | 3 | — | — | 30 | 3 | 10 | Tributyl acetylcitrate | 1.2 | 53.8 | 35 |
| Example 8 | 5 | — | — | 19 | 1 | 10 | Di(butoxyethyl) adipate | 1.2 | 53.8 | 35 |
| Example 9 | 3 | — | — | — | 3 | 10 | Di(butoxyethyl) adipate | 1.2 | 53.8 | 35 |
| Example 10 | 3 | — | — | 20 | 4 | 10 | Di(butoxyethyl) adipate | 1.2 | 53.8 | 35 |
| Example 11 | 1 | — | — | — | 1 | 10 | Di(butoxyethyl) adipate | 1.2 | 53.8 | 35 |
| Example 12 | 8 | — | — | — | 6 | 10 | Di(butoxyethyl) adipate | 1.2 | 53.8 | 35 |
| Example 13 | 4 | — | — | — | 2 | 10 | Triethylene glycol bis(2-ethylhexanoate) | 1.2 | 53.8 | 35 |
| Example 14 | — | — | — | — | 1 | 10 | Triethylene glycol dihexanoate | 1.2 | 53.8 | 35 |
| Example 15 | — | 6 | — | 8 | 3 | 10 | Tributyl acetylcitrate | 1.2 | 53.8 | 35 |
| Example 16 | 4 | — | 4 | — | 3 | 10 | Di(butoxyethyl) adipate | 1.2 | 53.8 | 35 |
| Example 17 | 1 | — | 30 | — | 1 | 10 | Triethylene glycol bis(2-ethylhexanoate) | 1.2 | 53.8 | 35 |
| Example 18 | 4 | — | 40 | — | 4 | 10 | Triethylene glycol dihexanoate | 1.2 | 53.8 | 35 |
| Example 19 | 7 | — | 27 | 15 | 7 | 10 | Triethylene glycol bis(2-ethylhexanoate) | 1.2 | 53.8 | 35 |
| Example 20 | 7 | — | 24 | — | 7 | 10 | Triethylene glycol dihexanoate | 1.2 | 53.8 | 35 |
| Example 21 | 4 | — | 17 | — | 4 | 10 | Triethylene glycol bis(2-ethylhexanoate) | 1.2 | 53.8 | 35 |
| Example 22 | 5 | — | — | 35 | 5 | 10 | Triethylene glycol dihexanoate | 1.2 | 53.8 | 35 |
| Example 23 | 4 | — | 20 | 17 | 4 | 10 | Tributyl acetylcitrate | 1.2 | 53.8 | 35 |
| Example 24 | 3 | — | 32 | — | — | 10 | Di(butoxyethyl) adipate | 1.2 | 53.8 | 35 |
| Example 25 | 1 | — | 24 | — | — | 10 | Triethylene glycol dihexanoate | 1.2 | 53.8 | 35 |
| Example 28 | 3 | — | — | 22 | — | 10 | Triethylene glycol bis(2-ethylhexanoate) | 1.2 | 53.8 | 35 |
| Example 27 | 3 | — | 10 | 15 | — | 10 | Di(butoxyethyl) adipate | 1.2 | 53.8 | 35 |

TABLE 2

| | (Meth)acrylic resin formulation (% by weight) | | | | | | | | | |
|---|---|---|---|---|---|---|---|---|---|---|
| | | | | Component derived from (meth)acrylate containing ester substituent having carbon number of 8 or more (carbon number of ester substituent) | | | | | Component derived from glycidyl group-containing (meth)acrylate | Component derived from other monomers |
| | Component derived from MMA | Component derived from iBMA | Total amount of MMA and iBMA | 2EHMA (8) | iDMA (10) | LMA (12) | PEOMA (8) | Total | GMA | MAA |
| Comparative Example 1 | 60 | 31 | 91 | — | 9 | — | — | 9 | — | — |
| Comparative Example 2 | 10 | — | 10 | — | 40 | — | — | 40 | — | — |
| Comparative Example 3 | 10 | — | 10 | — | 9 | — | — | 9 | — | — |
| Comparative Example 4 | — | 60 | 60 | 30 | — | — | — | 30 | — | — |
| Comparative Example 5 | 60 | — | 60 | 29 | — | — | — | 29 | 11 | — |
| Comparative Example 6 | — | 60 | 60 | — | 40 | — | — | 40 | — | — |
| Comparative Example 7 | 100 | — | 100 | — | — | — | — | 0 | — | — |
| Comparative Example 8 | — | 100 | 100 | — | — | — | — | 0 | — | — |
| Comparative Example 9 | — | 63 | 63 | 27 | — | — | — | 27 | — | — |
| Comparative Example 10 | — | 90 | 90 | 7.5 | — | — | — | 7.5 | 0.5 | 2.5 |
| Comparative Example 11 | 12.5 | 75 | 87.5 | — | — | 12 | — | 12 | 0.5 | — |
| Comparative Example 12 | 45 | 2 | 47 | — | — | 41 | — | 41 | 12 | — |
| Comparative Example 13 | 25 | 40 | 65 | — | — | 35 | — | 35 | — | — |
| Comparative Example 14 | — | — | 0 | — | — | 20 | — | 20 | — | — |
| Comparative Example 15 | 9 | — | 9 | — | — | — | — | 10 | 11 | — |
| Comparative Example 16 | 60 | 15 | 75 | — | — | 5 | — | 5 | 5 | — |
| Comparative Example 17 | — | 66 | 66 | — | — | 4 | — | 4 | 3 | — |
| Comparative Example 18 | 35.6 | 20 | 55.6 | — | — | 24 | — | 24 | 0.4 | — |

| | (Meth)acrylic resin formulation (% by weight) | | | Inorganic fine particle-dispersed slurry composition (% by weight) | | | | |
|---|---|---|---|---|---|---|---|---|
| | Component derived from other monomers | | | Resin component | Plasticizer | | Organic solvent | Inorganic fine particle |
| | EMA | BMA | HEMA | | Type | Amount | | |
| Comparative Example 1 | — | — | — | 10 | Dibutyl phthalate | 0.2 | 54.8 | 35 |
| Comparative Example 2 | — | 50 | — | 10 | Di-n-octyl phthalate | 0.2 | 54.8 | 35 |
| Comparative Example 3 | — | 81 | — | 10 | Benzylbutyl phthalate | 0.2 | 54.8 | 35 |
| Comparative Example 4 | — | — | 10 | 10 | Dibutyl phthalate | 1.2 | 53.8 | 35 |
| Comparative Example 5 | — | — | — | 10 | Di-n-octyl phthalate | 1.2 | 53.8 | 35 |
| Comparative Example 6 | — | — | — | 10 | Benzylbutyl phthalate | 1.2 | 53.8 | 35 |
| Comparative Example 7 | — | — | — | 10 | Di(butoxyethyl) adipate | 1.2 | 53.8 | 35 |
| Comparative Example 8 | — | — | 10 | 10 | Di(butoxyethyl) adipate | 1.2 | 53.8 | 35 |
| Comparative Example 9 | — | — | — | 10 | Di(butoxyethyl) adipate | 1.2 | 53.8 | 35 |
| Comparative Example 10 | — | — | — | 10 | Dibutyl phthalate | 1.2 | 53.8 | 35 |
| Comparative Example 11 | — | — | — | 10 | Dibutyl phthalate | 1.2 | 53.8 | 35 |

TABLE 2-continued

| | | | | | | |
|---|---|---|---|---|---|---|
| Comparative Example 12 | — | — | — | 10 | Dibutyl phthalate | 1.2 | 53.8 | 35 |
| Comparative Example 13 | 40 | 40 | — | 10 | Dibutyl phthalate | 1.2 | 53.8 | 35 |
| Comparative Example 14 | — | 70 | — | 10 | Dibutyl phthalate | 1.2 | 53.8 | 35 |
| Comparative Example 15 | — | 15 | — | 10 | Dibutyl phthalate | 1.2 | 53.8 | 35 |
| Comparative Example 16 | 27 | — | — | 10 | Dibutyl phthalate | 1.2 | 53.8 | 35 |
| Comparative Example 17 | — | 9 | 11 | 10 | Dibutyl phthalate | 1.2 | 53.8 | 35 |
| Comparative Example 18 | — | 15 | — | 10 | Dibutyl phthalate | 1.2 | 53.8 | 35 |

TABLE 3

| | (Meth)acrylic resin formulation (% by weight) | | | | | | | | | |
|---|---|---|---|---|---|---|---|---|---|---|
| | Component derived from MMA | Component derived from iBMA | Total amount of MMA and iBMA | Component derived from (meth)acrylate containing ester substituent having carbon number of 8 or more (carbon number of ester substituent) | | | | | Component derived from glycidyl group-containing (meth)acrylate GMA | Component derived from other monomers EMA |
| | | | | 2EHMA (8) | iDMA (10) | LMA (12) | EPOMA (11) | Total | | |
| Example 28 | 45 | 15 | 60 | — | 10 | — | — | 10 | 5 | — |
| Example 29 | 40 | — | 40 | — | — | 10 | — | 10 | 10 | — |
| Example 30 | 21.7 | 48.3 | 70 | 24 | — | — | — | 24 | 3 | — |
| Example 31 | — | 20 | 20 | 24 | — | — | — | 24 | 7 | 27 |
| Comparative Example 19 | 60 | 31 | 91 | — | 9 | — | — | 9 | — | — |
| Comparative Example 20 | 10 | — | 10 | — | 9 | — | — | 9 | — | — |
| Comparative Example 21 | — | 60 | 60 | 29 | — | — | — | 29 | 11 | — |
| Comparative Example 22 | 9 | — | 9 | — | — | 10 | — | 10 | 11 | — |

| | (Meth)acrylic resin formulation (% by weight) | | Inorganic fine particle-dispersed slurry composition (% by weight) | | | | | |
|---|---|---|---|---|---|---|---|---|
| | Component derived from other monomers | | Resin component | Plasticizer | | Organic solvent | Inorganic fine particle |
| | BMA | HEMA | | Type | Amount | | | |
| Example 28 | 20 | 5 | 6 | Di(butoxyethyl) adipate | 1.2 | 62.8 | 30 |
| Example 29 | 40 | — | 6 | Triethylene glycol bis(2-ethylhexanoate) | 1.2 | 62.8 | 30 |
| Example 30 | — | 3 | 6 | Triethylene glycol dihexanoate | 1.2 | 62.8 | 30 |
| Example 31 | 15 | 7 | 6 | Tributyl acetylcitrate | 1.2 | 62.8 | 30 |
| Comparative Example 19 | — | — | 6 | Dibutyl phthalate | 1.2 | 62.8 | 30 |
| Comparative Example 20 | 81 | — | 6 | Di-n-octyl phthalate | 1.2 | 62.8 | 30 |
| Comparative Example 21 | — | — | 6 | Benzylbutyl phthalate | 1.2 | 62.8 | 30 |
| Comparative Example 22 | 70 | — | 6 | Dibutyl phthalate | 1.2 | 62.8 | 30 |

<Evaluation>

The following evaluations were performed on the (meth)acrylic resins, inorganic fine particle-dispersed slurry compositions, inorganic fine particle-dispersed sheets, all-solid-state batteries, ceramic green sheets, and ceramic fired bodies obtained in the examples and comparative examples. Tables 4 to 6 show the results.

(1) Measurement of Average Molecular Weight

The weight average molecular weight (Mw) and the number average molecular weight (Mn) in terms of polystyrene of the obtained (meth)acrylic resin were measured by gel permeation chromatography using a column LF-804 (Shoko Science Co., Ltd.). The obtained Mw and Mw/Mn were analyzed.
o (Good): The Mw was within the range of 100,000 to 3,000,000 and the Mw/Mn was 2 or higher and 8 or less.
x (Poor): The requirement of "o (Good)" was not satisfied.

(2) Measurement of Glass Transition Temperature

The glass transition temperature (Tg) of the obtained (meth)acrylic resin was measured using a differential scanning calorimeter (DSC). The obtained Tg was analyzed and evaluated according to the following criteria.
o (Good): The Tg was 30° C. or higher and 60° C. or lower.
x (Poor): The Tg was lower than 30° C. or higher than 60° C.

(3) Resin Sheet Tensile Test

The obtained resin composition was applied to a release-treated PET film with an applicator, and dried at 100° C. for 10 minutes with a fan oven to prepare a resin sheet having a thickness of 20 μm. Graph paper was used as a cover film. A strip-shaped specimen having a width of 1 cm was prepared with scissors.

The obtained specimen was subjected to a tensile test under the conditions of 23° C. and 50 RH using an autograph AG-IS (available from Shimadzu Corp.) at an inter-chuck distance of 3 cm and a pulling speed of 10 mm/min. The stress-strain characteristics (presence or absence of yield stress and maximum stress measurement) were determined. The results were evaluated according to the following criteria.
o (Good): Yield stress was exhibited and the maximum stress was 20 N/mm$^2$ or higher.
x (Poor): The requirement of the "o (Good)" was not satisfied.

(4) Sinterability

The obtained inorganic fine particle-dispersed slurry composition was put in an alumina pan of a TG-DTA device, and heated at 10° C./min to evaporate the solvent and thermally decompose the resin and the plasticizer. Thereafter, the temperature at which the weight was 36% by weight (90% by weight degreasing was finished) was measured, and taken as the decomposition ending temperature. The obtained decomposition ending temperature was evaluated according to the following criteria.
oo (Excellent): The decomposition ending temperature was 270° C. or lower.

o (Good): The decomposition ending temperature was higher than 270° C. and 300° C. or lower.
x (Poor): The decomposition ending temperature was higher than 300° C.

(5) Battery Performance Evaluation

The obtained all-solid-state battery was charged to 4.0 V at 0.1 mA and discharged to 3.5 V using a charge-discharge test system TOSCAT-3000 (available from Toyo System Co., Ltd). This cycle was repeated 30 times. The discharge capacity at the 30th cycle was evaluated according to the following criteria. In Comparative Examples 1, 2, and 5 to 10, the all-solid-state battery could not be prepared, so that the charge-discharge evaluation could not be performed. The negative electrode/solid electrolyte/positive electrode laminated sheets obtained in Comparative Examples 3 and 11 turned brown, and the resulting all-solid-state batteries did not function as a battery. In Comparative Examples 12 to 16 and 18, the inorganic fine particle-dispersed sheets had too high tackiness, and thus wrinkled or broke when separated from the support film. The all-solid-state batteries obtained therefrom could not be electrified after several charge-discharge cycles.

oo (Excellent): The discharge capacity was 60 mAh or higher.
o (Good): The discharge capacity was 10 mAh or higher and lower than 60 mAh.
x (Poor): The discharge capacity was lower than 10 mAh or the charge-discharge evaluation could not be performed.

TABLE 4

| | Average molecular weight | | | Resin Tg | | Tensile test | | | Sinterability Decomposition ending temperature | | Battery performance Discharge capacity | |
|---|---|---|---|---|---|---|---|---|---|---|---|---|
| | Mw | Mw/Mn | Rating | (° C.) | Rating | Yield stress | Maximum stress (N/mm²) | Rating | (° C.) | Rating | (mAh) | Rating |
| Example 1 | 100,000 | 2 | o | 60 | o | Present | 27 | o | 300 | o | 18.3 | o |
| Example 2 | 3,000,000 | 8 | o | 42 | o | Present | 28 | o | 300 | o | 14.7 | o |
| Example 3 | 1,000,000 | 6 | o | 47 | o | Present | 28 | o | 300 | o | 17.2 | o |
| Example 4 | 500,000 | 2 | o | 49 | o | Present | 27 | o | 295 | o | 12.0 | o |
| Example 5 | 1,000,000 | 8 | o | 56 | o | Present | 24 | o | 292 | o | 18.3 | o |
| Example 6 | 3,000,000 | 5 | o | 48 | o | Present | 33 | o | 300 | o | 10.2 | o |
| Example 7 | 100,000 | 4 | o | 46 | o | Present | 25 | o | 295 | o | 18.3 | o |
| Example 8 | 100,000 | 2 | o | 31 | o | Present | 20 | o | 280 | o | 50 | o |
| Example 9 | 1,000,000 | 6 | o | 48 | o | Present | 32 | o | 280 | o | 54.3 | o |
| Example 10 | 1,000,000 | 6 | o | 56 | o | Present | 32 | o | 280 | o | 54.3 | o |
| Example 11 | 3,000,000 | 8 | o | 59 | o | Present | 25 | o | 280 | o | 62.5 | o |
| Example 12 | 450,000 | 4 | o | 40 | o | Present | 37 | o | 280 | o | 33.3 | o |
| Example 13 | 300,000 | 4 | o | 49 | o | Present | 35 | o | 280 | o | 52.6 | o |
| Example 14 | 400,000 | 4 | o | 59 | o | Present | 38 | o | 280 | o | 29.4 | o |
| Example 15 | 500,000 | 5 | o | 50 | o | Present | 38 | o | 280 | o | 31.2 | o |
| Example 16 | 500,000 | 4 | o | 37 | o | Present | 39 | o | 280 | o | 48.2 | o |
| Example 17 | 100,000 | 3 | o | 39 | o | Present | 21 | o | 280 | o | 56.0 | o |
| Example 18 | 2,800,000 | 8 | o | 44 | o | Present | 46 | o | 280 | o | 47.3 | o |
| Example 19 | 1,000,000 | 8 | o | 35 | o | Present | 44 | o | 280 | o | 42.2 | o |
| Example 20 | 300,000 | 4 | o | 45 | o | Present | 37 | o | 280 | o | 48.6 | o |
| Example 21 | 400,000 | 4 | o | 39 | o | Present | 36 | o | 280 | o | 41.9 | o |
| Example 22 | 500,000 | 5 | o | 37 | o | Present | 36 | o | 280 | o | 42.1 | o |
| Example 23 | 100,000 | 2 | o | 45 | o | Present | 21 | o | 280 | o | 39.7 | o |
| Example 24 | 700,000 | 4 | o | 48 | o | Present | 40 | o | 270 | oo | 61 | oo |
| Example 25 | 1,000,000 | 6 | o | 38 | o | Present | 26 | o | 270 | oo | 66 | oo |
| Example 26 | 700,000 | 4 | o | 44 | o | Present | 42 | o | 270 | oo | 63 | oo |
| Example 27 | 700,000 | 4 | o | 46 | o | Present | 43 | o | 270 | oo | 63 | oo |

TABLE 5

| | Average molecular weight | | | Resin Tg | | Tensile test | | | Sinterability Decomposition ending temperature | | Battery performance Discharge capacity | |
|---|---|---|---|---|---|---|---|---|---|---|---|---|
| | Mw | Mw/Mn | Rating | (° C.) | Rating | Yield stress | Maximum stress (N/mm²) | Rating | (° C.) | Rating | (mAh) | Rating |
| Comparative Example 1 | 80,000 | 2 | x | 76 | x | Absent | 20 | x | 380 | x | — | x |
| Comparative Example 2 | 500,000 | 3 | o | 4 | x | Absent | 7 | x | 380 | x | — | x |
| Comparative Example 3 | 500,000 | 3 | o | 10 | x | Absent | 8 | x | 380 | x | — | x |
| Comparative Example 4 | 3,000,000 | 10 | x | 34 | o | Absent | 10 | x | 300 | x | 9 | x |

TABLE 5-continued

|  | Average molecular weight | | | Resin Tg | | Tensile test | | | Sinterability Decomposition ending temperature | | Battery performance Discharge capacity | |
|---|---|---|---|---|---|---|---|---|---|---|---|---|
|  | Mw | Mw/Mn | Rating | (° C.) | Rating | Yield stress | Maximum stress (N/mm²) | Rating | (° C.) | Rating | (mAh) | Rating |
| Comparative Example 5 | 80,000 | 2 | x | 33 | o | Absent | 18 | x | 420 | x | — | x |
| Comparative Example 6 | 1,000,000 | 3 | o | 47 | o | Absent | 10 | x | 350 | x | — | x |
| Comparative Example 7 | 1,000,000 | 2 | o | 53 | o | Absent | 15 | x | 320 | x | — | x |
| Comparative Example 8 | 180,000 | 2 | o | 36 | o | Absent | 12 | x | 330 | x | — | x |
| Comparative Example 9 | 150,000 | 2 | o | 50 | o | Absent | 9 | x | 350 | x | — | x |
| Comparative Example 10 | 3,100,000 | 9 | x | 45 | o | Absent | 50 | x | 280 | x | — | x |
| Comparative Example 11 | 80,000 | 2 | x | 26 | x | Absent | 3 | x | 450 | x | — | x |
| Comparative Example 12 | 500,000 | 4 | o | 25 | x | Absent | 16 | x | 320 | x | — | x |
| Comparative Example 13 | 4,000,000 | 9 | x | 21 | x | Absent | 13 | x | 390 | x | — | x |
| Comparative Example 14 | 200,000 | 4 | o | 21 | x | Absent | 10 | x | 440 | x | — | x |
| Comparative Example 15 | 80,000 | 2 | x | 72 | x | Absent | 25 | x | 470 | x | — | x |
| Comparative Example 16 | 1,000,000 | 6 | o | 51 | o | Absent | 19 | x | 270 | oo | — | x |
| Comparative Example 17 | 1,000,000 | 6 | o | 40 | o | Present | 33 | o | 380 | x | 1 | x |
| Comparative Example 18 | 1,000,000 | 6 | o | 11 | x | Absent | 5 | x | 300 | x | — | x |

In Examples 1 to 23, excellent characteristics were shown in all of the evaluations. In Examples 24 to 27, better decomposability at low temperature was exhibited and particularly excellent battery characteristics were achieved.

On the other hand, the formulations of Comparative Examples 1 to 16 and 18 did not exhibit yield stress in the tensile test, and the samples broke at a strain of less than 10%. As no yield stress was exhibited and a strong plasticizer effect was exerted in processing the resin composition into the inorganic sheets, the green sheets lacked resilience and thus had poor handleability. The inorganic fine particle-dispersed sheets obtained in Comparative Examples 17 and 18 turned brown, and a large amount of firing residue was produced.

(6) Sheet Windability

A release-treated PET film as a protective film was bonded to one side of the ceramic green sheet obtained in each of Examples 28 to 31 and Comparative Examples 19 to 22 to prepare an inorganic fine particle-dispersed sheet for evaluation.

The obtained inorganic fine particle-dispersed sheet was wound around a polypropylene pipe having a diameter of 15 cm and a length of 50 cm to give a roll. The roll was allowed to stand at a room temperature of 23° C. for 24 hours.

The ceramic green sheet was unwound from the roll. A 20 cm×45 cm sheet was cut out from each of a portion 5 m away from the end and a portion 10 m away from the end to prepare evaluation sheets. The state of the evaluation sheets was visually observed. In Comparative Example 20, the ceramic green sheet could not be separated from the roll, so that the evaluation sheets could not be prepared and the sheet windability could not be evaluated.

o (Good): No crack was observed.

x (Poor): Evaluation sheets could not be prepared or crack(s) was observed.

(7) Sheet Adhesiveness

Each of the ceramic fired bodies obtained in Examples 28 to 31 and Comparative Examples 19 to 22 was cooled to room temperature. Each ceramic fired body was cut in a direction perpendicular to the lamination surface in the center portion. The state of the sheet cross section near the 50th layer was observed with an electron microscope to determine the presence or absence of separation between the ceramic layer and the conductive layer. The evaluation was performed according to the following criteria. In Comparative Examples 19 and 20, the laminate could not be prepared, so that the ceramic fired body could not be prepared. The sheet adhesiveness thus could not be evaluated.

o (Good): No separation between the layers was observed.

x (Poor): The ceramic fired body could not be prepared or separation between the layers was observed.

TABLE 6

| | Average molecular weight | | | Resin Tg | | Sheet windability | | Sheet adhesiveness | |
|---|---|---|---|---|---|---|---|---|---|
| | Mw | Mw/Mn | Rating | (° C.) | Rating | Results | Rating | Observation of sheet cross-section | Rating |
| Example 28 | 100,000 | 2 | ○ | 60 | ○ | No cracks | ○ | No separation between layers | ○ |
| Example 29 | 3,000,000 | 5 | ○ | 48 | ○ | No cracks | ○ | No separation between layers | ○ |
| Example 30 | 1,000,000 | 6 | ○ | 48 | ○ | No cracks | ○ | No separation between layers | ○ |
| Example 31 | 1,000,000 | 8 | ○ | 35 | ○ | No cracks | ○ | No separation between layers | ○ |
| Comparative Example 19 | 80,000 | 2 | x | 76 | x | Cracks observed | x | Evaluation impossible | x |
| Comparative Example 20 | 500,000 | 3 | ○ | 10 | x | Evaluation impossible | x | Evaluation impossible | x |
| Comparative Example 21 | 80,000 | 2 | x | 33 | ○ | No cracks | ○ | Separation between layers observed | x |
| Comparative Example 22 | 200,000 | 4 | ○ | 21 | X | No cracks | ○ | Separation between layers observed | x |

In Examples 28 to 31, excellent characteristics were shown in all of the evaluations. On the other hand, in Comparative Example 19, cracks were observed in the sheet windability evaluation. In Comparative Example 20, the ceramic green sheet could not be separated from the roll, and the sheet windability could not be evaluated. In Comparative Examples 19 and 20, the laminate could not be prepared, so that the ceramic fired body could not be prepared. In Comparative Examples 21 and 22, although no cracks were observed in the sheet windability evaluation, the inorganic fine particle-dispersed sheets turned brown and a large amount of firing residue was produced. In addition, the cross-sectional observation of the ceramic fired body showed separation between the layers due to the firing residue.

INDUSTRIAL APPLICABILITY

The present invention can provide a resin composition which has excellent decomposability at low temperature, can provide a molded article having high strength, and enables an increase in the number of layers and thinning so as to enable production of an all-solid-state battery and a ceramic laminate (e.g., a multilayer ceramic capacitor) having excellent properties. The present invention can also provide an inorganic fine particle-dispersed slurry composition containing the resin composition, an inorganic fine particle-dispersed sheet, a method for producing an all-solid-state battery, and a method for producing a multilayer ceramic capacitor.

The invention claimed is:

1. A resin composition comprising
a (meth)acrylic resin having a glass transition temperature of 40° C. or higher and 60° C. or lower,
wherein the (meth)acrylic resin comprises a segment derived from methyl methacrylate, a segment derived from isobutyl methacrylate, a segment derived from a glycidyl group-containing (meth)acrylate, and a segment derived from a (meth)acrylate containing an ester substituent having a carbon number of 8 or more,
a total amount of the segment derived from methyl methacrylate and the segment derived from isobutyl methacrylate is 55 to 70% by weight,
an amount of the segment derived from a glycidyl group-containing (meth)acrylate is 1 to 10% by weight,
an amount of the segment derived from a (meth)acrylate containing an ester substituent having a carbon number of 8 or more is 15 to 40% by weight,
the (meth)acrylic resin has a weight average molecular weight (Mw) of 100,000 to 3,000,000,
a ratio (Mw/Mn) of a weight average molecular weight (Mw) to a number average molecular weight (Mn) of the (meth)acrylic resin is 2 or higher and 8 or lower, and
the (meth)acrylic resin is obtained by copolymerizing a monomer mixture containing 55 to 70% by weight in total of methyl methacrylate and isobutyl methacrylate, 1 to 10 by weight of a glycidyl group-containing (meth)acrylate and 15 to 40% by weight of a (meth)acrylate containing an ester substituent having a carbon number of 8 or more.

2. The resin composition according to claim 1, wherein in the (meth)acrylate containing an ester substituent having a carbon number of 8 or more, the ester substituent has a carbon number of 8 to 20 and has a branched chain structure.

3. The resin composition according to claim 1, wherein the (meth)acrylate containing an ester substituent having a carbon number of 8 or more is a (meth)acrylate containing a branched alkyl group having a carbon number of 8 to 20 or a polyalkylene glycol methacrylate having a branched alkylene glycol structure wherein the total number of carbon atoms in the ester substituent is 8 or more.

4. The resin composition according to claim 1, wherein a weight ratio of the amount of the segment derived from methyl methacrylate to the amount of the segment derived from isobutyl methacrylate in the (meth)acrylic resin is 15:85 to 95:5.

5. The resin composition according to claim 1, wherein the (meth)acrylic resin molded into a sheet form having a thickness of 20 μm has a maximum stress of 20 N/mm$^2$ or more in a tensile test.

6. The resin composition according to claim 1, wherein the amount of the segment derived from a glycidyl group-containing (meth)acrylate is 2 to 10% by weight.

7. An inorganic fine particle-dispersed slurry composition comprising:
the resin composition according to claim 1;
inorganic fine particles;
an organic solvent; and
a plasticizer.

8. The inorganic fine particle-dispersed slurry composition according to claim 7, wherein the inorganic fine particles comprise lithium or titanium.

9. The inorganic fine particle-dispersed slurry composition according to claim 7,
wherein the plasticizer comprises: a component derived from adipic acid, triethylene glycol, or citric acid; and an alkyl group having a carbon number of 4 or more, and
the plasticizer has a carbon:oxygen ratio of 5:1 to 3:1.

* * * * *